United States Patent [19]

Hardy et al.

[11] Patent Number: 4,802,639
[45] Date of Patent: Feb. 7, 1989

[54] HORIZONTAL-TAKEOFF TRANSATMOSPHERIC LAUNCH SYSTEM

[75] Inventors: Richard Hardy; Jonathan Hardy, both of Seattle; Thomas J. Kornell, Federal Way; Kenneth M. Tallquist, Bellevue, all of Wash.

[73] Assignee: The Boeing Company, Seattle, Wash.

[21] Appl. No.: 919,207

[22] Filed: Oct. 14, 1986

Related U.S. Application Data

[63] Continuation-in-part of Ser. No. 656,159, Sep. 28, 1984, abandoned.

[51] Int. Cl.$^4$ .............................................. B64G 1/14
[52] U.S. Cl. .................................... 244/2; 244/158 R; 244/160; 244/172; 244/137.4
[58] Field of Search ................. 244/158 R, 162, 160, 244/172, 73 R, 74, 2, 137 R, 137 A, 120, 137.1, 137.4; 89/1.81 S; 60/270.1

[56] References Cited

U.S. PATENT DOCUMENTS

| | | | |
|---|---|---|---|
| 2,009,296 | 7/1935 | Mayo | 244/2 |
| 2,364,803 | 12/1944 | Mayhew | 244/2 |
| 2,368,288 | 1/1945 | Couse et al. | 244/2 |
| 2,399,217 | 4/1946 | Fahrney | 244/2 |
| 2,481,542 | 9/1949 | Schuyler | 89/1.815 |
| 2,621,000 | 12/1952 | Robert | 244/2 |
| 2,876,677 | 3/1959 | Clark et al. | 89/1.5 |
| 2,883,125 | 4/1959 | Jarvis et al. | 244/2 |
| 2,981,499 | 4/1961 | Janney, II | 244/2 |
| 2,998,208 | 8/1961 | Di Perna | 244/2 |
| 3,000,593 | 9/1961 | Eggers et al. | 244/2 |
| 3,006,576 | 10/1961 | Elijah | 244/2 |
| 3,070,326 | 12/1962 | Griffith | 244/2 |
| 3,227,399 | 1/1966 | Dastoli et al. | 244/2 |
| 3,258,228 | 6/1966 | Crook | 244/46 |
| 3,261,571 | 7/1966 | Pinnes | 244/74 |
| 3,289,974 | 12/1966 | Cohen et al. | 244/1 |
| 3,369,771 | 2/1968 | Walley et al. | 244/162 |
| 3,419,234 | 12/1968 | Poirier | 244/137 |
| 3,516,624 | 6/1970 | Crook | 244/2 |
| 3,567,156 | 3/1971 | Bauer | 244/2 |
| 3,702,688 | 11/1972 | Faget | 244/155 |
| 3,703,998 | 11/1972 | Girard | 244/13 |
| 3,753,536 | 8/1973 | White | 244/1 |
| 3,756,024 | 9/1973 | Gay | 60/270.1 |
| 3,864,907 | 2/1975 | Corran | 60/270.1 |
| 3,999,728 | 12/1976 | Zimmer | 244/2 |
| 4,265,416 | 5/1981 | Jackson et al. | 244/140 |
| 4,267,987 | 5/1981 | McDonnell | 244/2 |
| 4,451,017 | 5/1984 | Marshall | 244/2 |

FOREIGN PATENT DOCUMENTS 2306811 8/1974 Fed. Rep. of Germany .......... 244/2

OTHER PUBLICATIONS

Peebles, "Air-Launched Shuttle Concepts", *Journal of the British Interplanetary Society*, Apr. 1983; vol. 36, No. 4, pp. 153-155.
Heppenheimer, "Scramjets That Will Reach Mach 25", *Popular Science*, Apr. 1986; pp. 94-97, 136 and 138.
"Technology Challenges Ahead", *Space Markets*, Spring 1986, p. 31.

*Primary Examiner*—Galen Barefoot
*Attorney, Agent, or Firm*—Joan H. Pauly

[57] ABSTRACT

This invention is directed toward providing a transatmospheric launch system that is essentially totally reusable, provides wide flexibility in choice of orbit, and may be launched quickly on short notice. The system of the invention is a two-stage horizontal takeoff and landing system. An orbiter vehicle (50) is integrated into the underside of an aircraft (2). Aircraft (2) has a cavity (4) opening aftwardly and downwardly to receive vehicle (50). Vehicle (50) and aircraft (2) are releasably connected by struts (30, 32). Aircraft (2) and vehicle (50) proceed to staging conditions under air breathing and then rocket power. Rocket engine (22) of aircraft (2) is throttled to produce a thrust differential with rocket engine (66) of vehicle (50). This differential causes vehicle (50) to automatically pivot away from aircraft (2) on struts (30, 32). After pivoting out of cavity (4), vehicle (50) is disengaged from struts (30, 32) and proceeds on its own to orbit. Aircraft (2) makes a conventional landing. Following reentry, vehicle (50) makes an unpowered horizontal landing. Separation is accomplished at a Mach number of about 3.3. In a second embodiment, the main engine of the orbiter (50') is a scramjet (101) instead of a rocket.

37 Claims, 9 Drawing Sheets

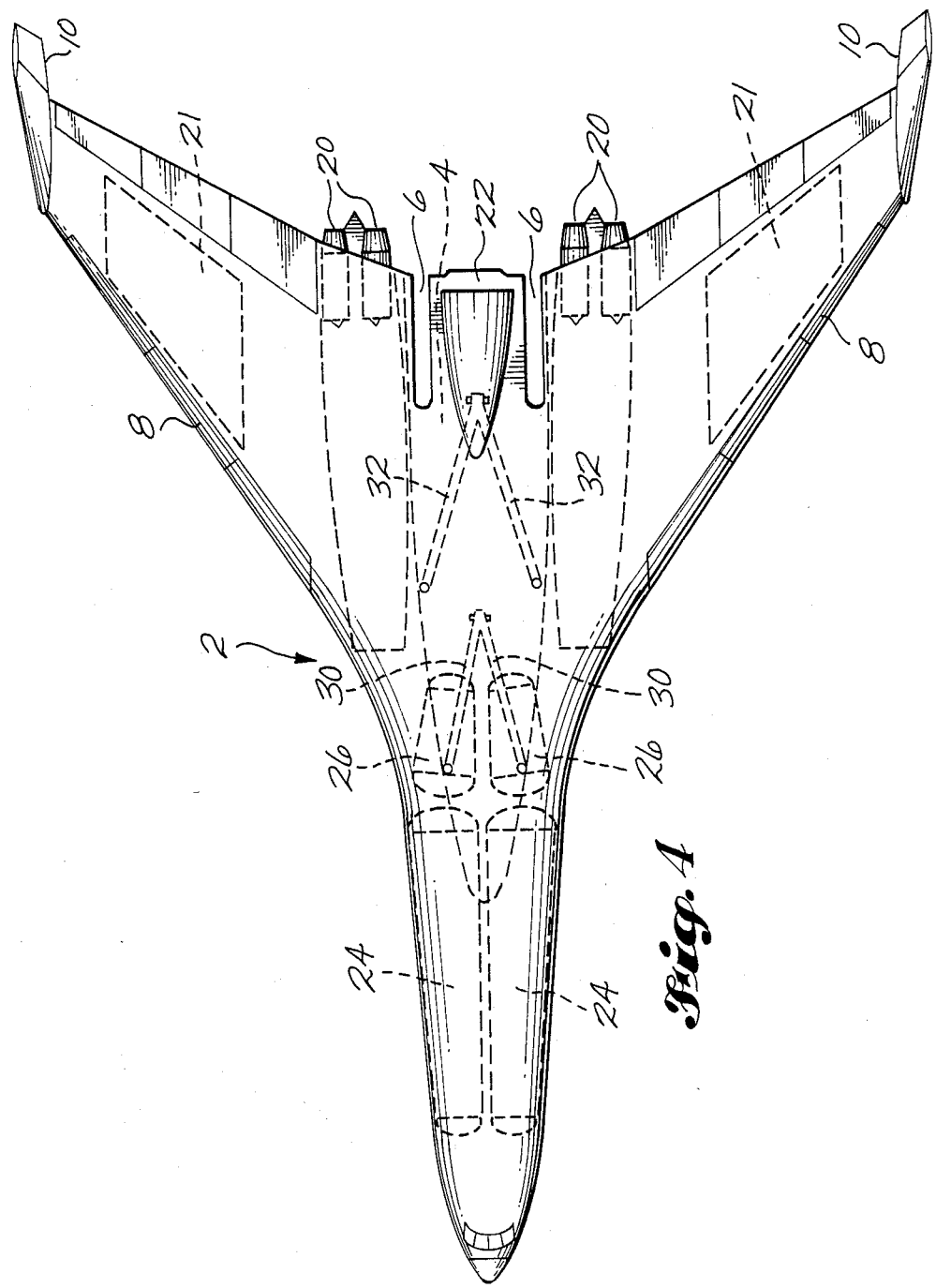

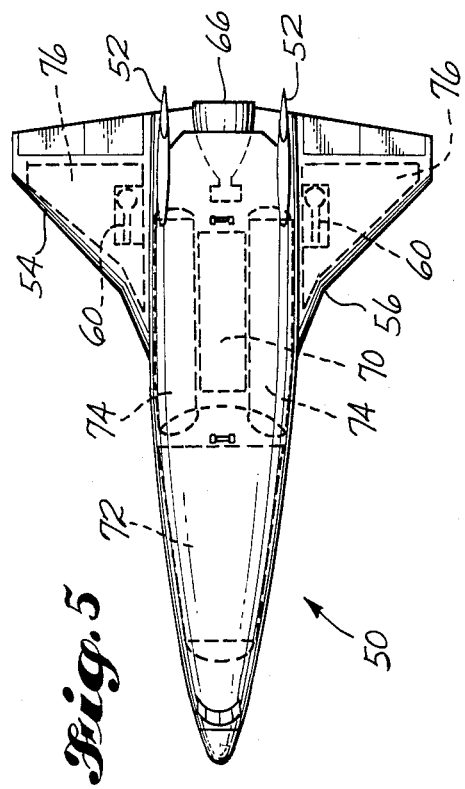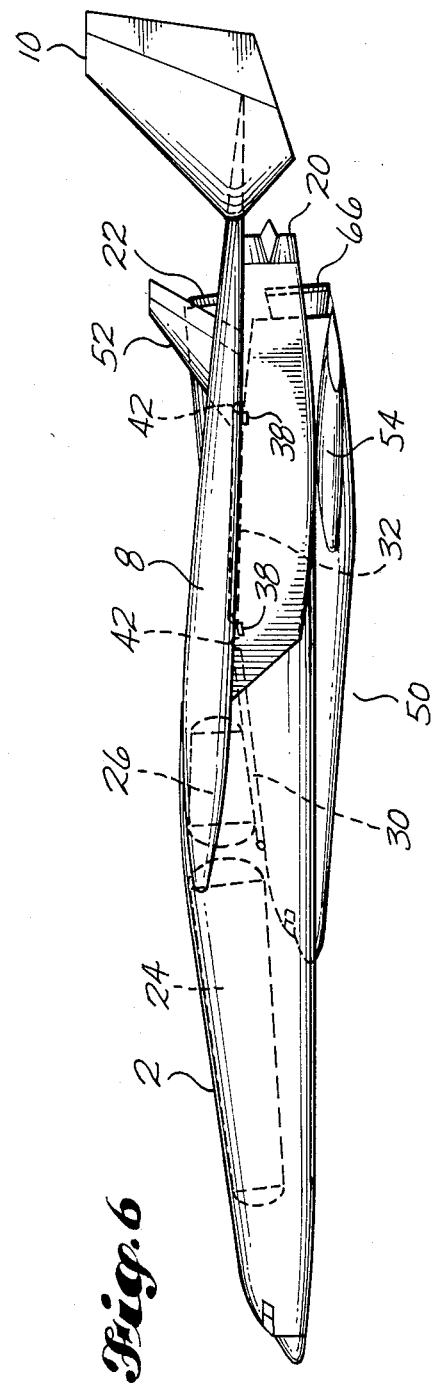

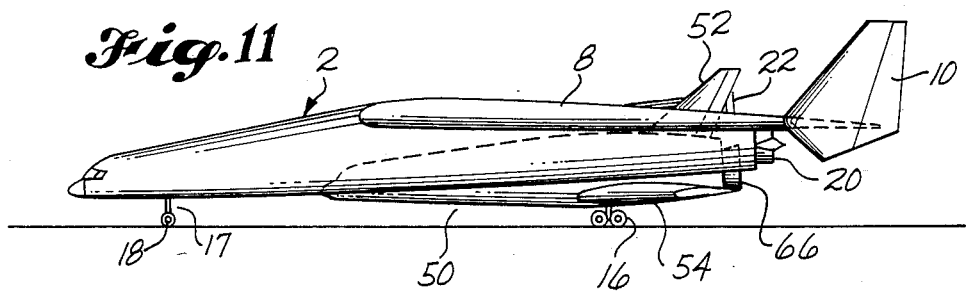
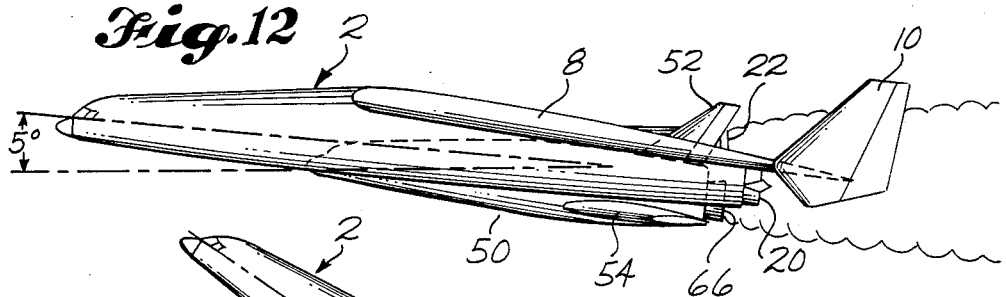
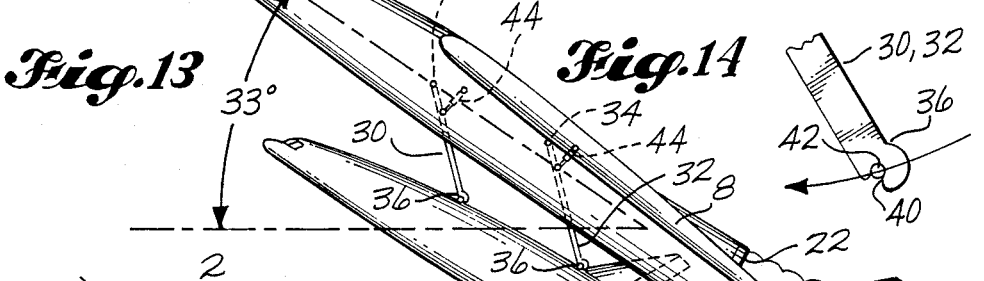
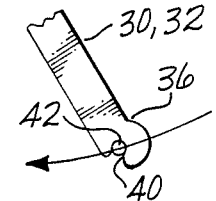
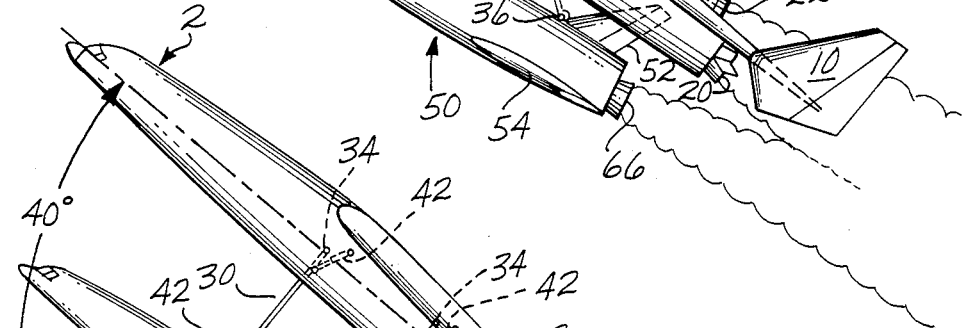
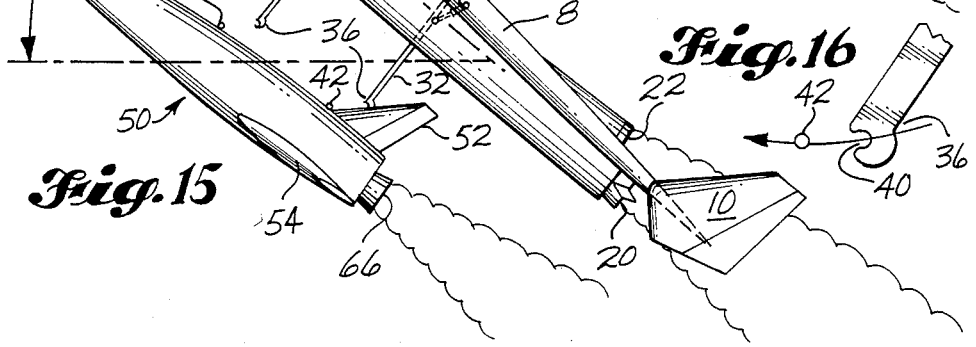

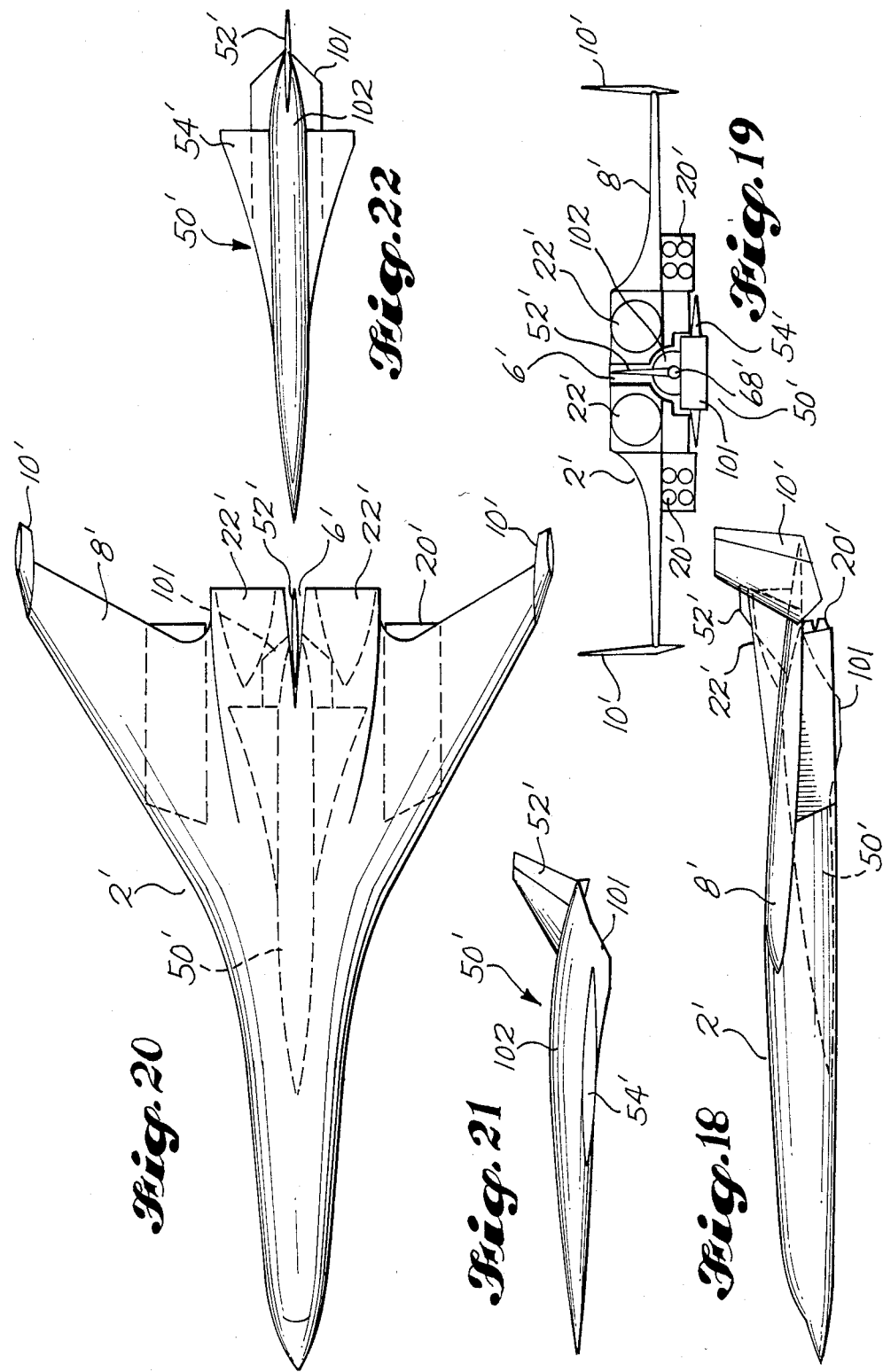

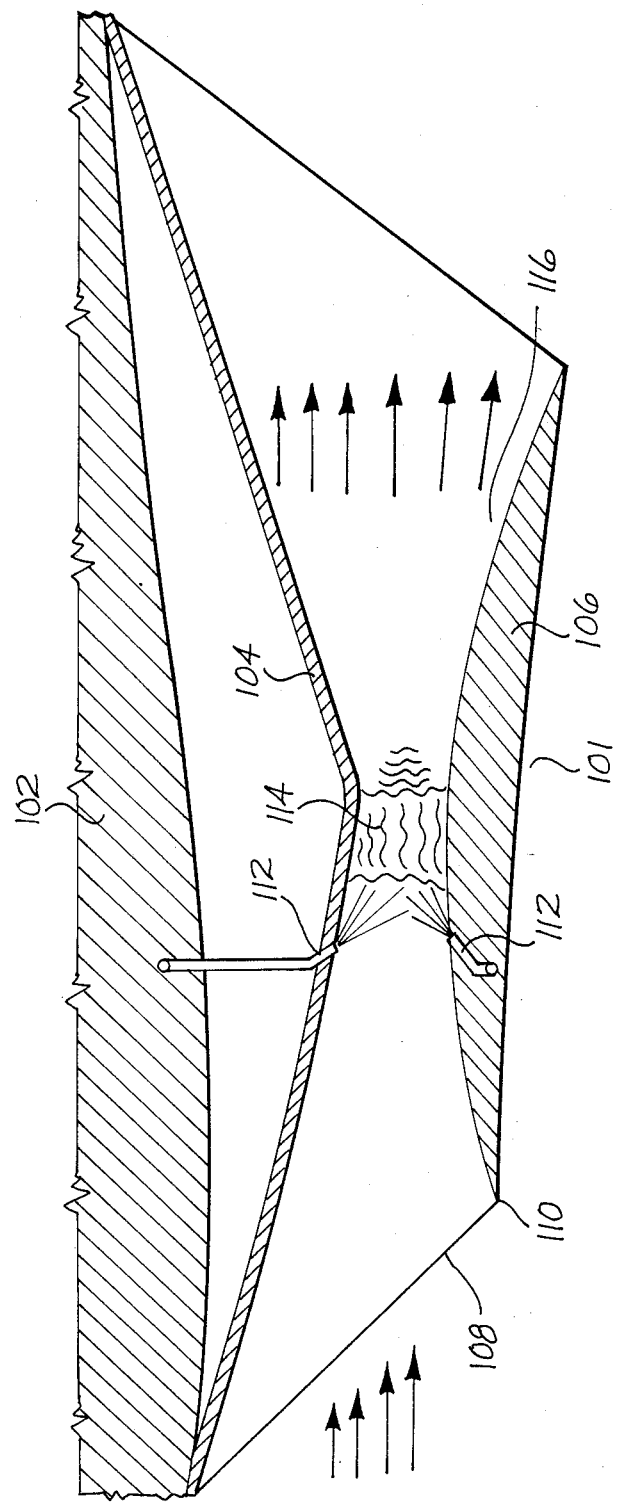

4,802,639

HORIZONTAL-TAKEOFF TRANSATMOSPHERIC LAUNCH SYSTEM

This is a continuation-in-part of U.S. application Ser. No. 06/656,159 filed Sept. 28, 1984, now abandoned.

TECHNICAL FIELD

This invention relates to methods and apparatus of transatmospheric launch systems and, more particularly, to such a method and apparatus in which a transatmospheric vehicle is integrated into the underside of an aircraft for a horizontal takeoff, the aircraft maneuvers under air breathing engine power to obtain a desired orbit inclination and launch azimuth, a thrust differential between an aircraft rocket engine and a transatmospheric vehicle rocket engine (or scramjet engine) automatically pivots the aircraft and vehicle away from each other to accomplish separation, and before separation the maximum Mach number is about 3.5.

BACKGROUND ART

The use of orbiting vehicles for carrying out various types of missions in space has been the subject of intense research and development activity in the past couple of decades. This activity has led to the space shuttle system that is currently in use. As is well-known, the current system is a vertical takeoff system in which a transatmospheric shuttle vehicle is mounted piggyback on booster rockets for takeoff and launch. This system has had considerable success and has accomplished a number of missions. However, vertical takeoff systems in general and the current shuttle system in particular have a number of serious limitations.

The problems associated with vertical takeoff systems include the need for complex, extremely heavy, and expensive ground support equipment in order to accomplish takeoff. Such equipment is necessary, for example, in order to handle the large vertically oriented booster stage and to accomplish the cumbersome process of mounting the orbiter vehicle up onto the booster stage in piggyback fashion. The need for such equipment results in very high launch costs and therefore a high cost for each of the missions performed by the orbit vehicle. In addition, such equipment is provided at only a very few highly specialized ground installations. This severe limitation on the choice of launch sites results in corresponding limitations on flexibility in the system in terms of obtainable orbits and/or times of launching.

Known vertical takeoff systems, such as the Space Shuttle, are also subject to the problem of nonreusability of portions of the booster structure. For example, some structural elements such as fuel tanks, are discarded at orbit altitude and cannot be recovered. The nonrecoverability and consequent total nonreusability of such elements adds significantly to the cost of the system since the total cost of such elements is a recurring cost that is fully experienced each time the orbit vehicle is launched. Other elements of the booster structure are recoverable but are reusable only in a limited sense since they generally require time consuming and expensive refurbishment. Therefore, only part of the cost of such recoverable elements is nonrecurring from launch to launch. The recurring portion of the cost of such recoverable elements further adds to the overall cost of the system.

Other problems associated with vertical takeoff systems include operational limitations that severely restrict the flexibility of such systems. The turn around time, or the time between launches, is quite long because of the need to recover and refurbish the recoverable booster structure and the relatively long time required to make all the preparations necessary for a vertical takeoff. These preparations include readying and positioning the booster stage and mounting the orbiter stage onto the booster stage. In addition to greatly extending turn around time, the long launch preparation time makes it virtually impossible to accomplish a launch on short notice.

The operational limitations also include severe limitations on the orbits that may be obtained from a given launch site without incurring unacceptable penalties. Such penalties include a great loss in time in waiting for the ground track of an orbiting structure that is to be intercepted by the transatmospheric vehicle to pass over the launch site. Efforts to avoid time penalties by providing the transatmospheric vehicle with significant orbit maneuver capabilities lead to the penalty of decreased payload capacity because of the need for the orbitor to carry with it into orbit a significantly increased amount of fuel. Such losses in payload capacity are generally prohibitive, and therefore, maneuvering in orbit is not a practical solution to the problem of providing orbit flexibility. The problem is further aggravated by the fact that orbits of inclination less than the launch latitude cannot be reached at all for most systems without an orbit plane change maneuver.

The time limitations of vertical takeoff systems—the long turn around and launch preparation times—can be tolerated in nonemergency situations in which a mission may be planned well in advance. However, emergency situations, such as those in which persons in orbit are in need of rescue or a military mission must be accomplished very quickly, the time restrictions of vertical launch systems are unacceptable. In order to provide the capability for adequately dealing with such emergency situations, there is a great need for a launch system in which preparations for a launch may be made on very short notice, a target orbit may be attained without time or weight penalties, and any necessary second and subsequent launchings may be accomplished fairly rapidly. Such quick launch and turn around capabilities and flexibility in obtainable orbits would also serve to reduce the cost of the launch system relative to both emergency and nonemergency missions.

Various concepts for horizontal takeoff launch systems have been suggested. These concepts avoid most of the problems associated with vertical takeoff systems, but have other problems associated with their proposed implementation. In general, these concepts cannot be made truly operational by use of existing technology. Therefore, the expected development costs of systems based on these concepts are quite high and dates of completion of operational systems would be relatively far into the future. Another problem associated with suggested horizontal takeoff concepts is the inability to meet the ever present need for a "positive" payload. For a launch system to be capable of providing a positive payload, it must be capable of launching into orbit a gross weight that is greater than the weight of the orbiter vehicle itself plus the fuel required by the orbiter vehicle. The gross weight minus the combined vehicle and fuel weight is the potential payload. In a fully operational practical launch system, the potential payload is not only positive but is also above a practical minimum. Finding a solution to the problem of providing a horizontal takeoff system capable of launching a positive payload that equals or exceeds a practical minimum has proved very difficult but is crucial to the success of any such system.

U.S. Pat. Nos. 3,702,688, granted Nov. 14, 1972, to M.A. Faget, and No. 4,265,416, granted May 5, 1981, to L.R. Jackson et al each disclose a system for launching a space shuttle type vehicle. The system disclosed by Faget is a two stage vertical takeoff system in which the shuttle vehicle is mounted on the booster vehicle in piggyback fashion. Faget describes the booster vehicle as being provided with air breathing auxiliary engines that are started after the booster attains a normal subsonic flight attitude following staging. The booster is than recovered by means of a conventional horizontal wheel landing. Upon completing its mission, the orbiter reenters and lands in a manner similar to the booster vehicle.

The launch system disclosed by Jackson et al is a horizontal takeoff and landing system. The system includes an orbit vehicle and two smaller booster vehicles. These booster vehicles are releasably connected to the underside of the two halves of the delta wing of the orbiter vehicle. Each connection is accomplished by means of a pylon that extends upwardly from the booster and is attached to the orbiter vehicle by exploding bolts. The boosters are unmanned and radio controlled. The lift required to ascend to the staging altitude is provided by the wings of both the orbiter and the booster vehicles.

The patent literature also includes proposals for linking two space vehicles. In U.S. Pat. No. 3,289,974, granted Dec. 6, 1966, C.B. Cohen et al disclose a two stage orbit vehicle. This vehicle consists of a delta wing aircraft that is nested into the top of a pod that provides space for crew movement and payload equipment during orbit and a heat shield for the aircraft during reentry. The two stages separate following reentry and prior to landing. Telescoping rods eject the aircraft from the pod. The aircraft makes a conventional wheel landing, and the pod descends by parachute. U.S. Pat. No. 3,753,536, granted Aug. 21, 1973, to N. White discloses a mechanism for coupling two orbiting space vehicles. A larger carrier vehicle extends an annular coupling from a hold in its body. The vehicle to be carried moves into engagement with the annular coupling and then is swung down into the hold of the carrier vehicle.

In U.S. Pat. No. 2,368,288, granted Jan. 30, 1945, K.W. Couse et al disclose a system in which supply units, such as ground vehicles, are attached to a dual fuselage aircraft for transport by the aircraft. A ground vehicle to be transported is separated into forward and aft portions which are rolled into contact with the forward and aft portions, respectively, of the center wing of the aircraft. Each half of the ground vehicle has a slot therein which receives a portion of the center wing. When the two halves have been rolled into position surrounding the wing, the two halves are secured together and take on the appearance of a third fuselage.

U.S. Pat. Nos. 3,227,399, granted Jan. 4, 1966, to J. Dastoli et al, and 3,999,728, granted Dec. 28, 1976, to G. F. Zimmer each disclose a composite aircraft configuration in which an escape capsule or compartment is integrated into a top portion of the main part of the aircraft. In the Dastoli configuration, the detachable compartment forms the upper portion of the fuselage of the complete aircraft. The compartment is provided with retractable helicopter blades, and a hydraulic release allows the compartment to move upwardly. The Zimmer escape capsule forms the cabin and part of the leading edges the wings of the complete aircraft. The capsule is separated by means of rockets that are carried by the capsule and are directed toward the main portion of the aircraft to provide an ejection force.

A number of other examples of composite aircraft configurations can be found in the patent literature. These configurations have purposes such as launching an aircraft, providing an escape, and transporting cargo. U.S. Pat. Nos. 2,009,296, granted Jul. 23, 1935, to R. H. Mayo, 2,364,803, granted Dec. 12, 1944, to P. Mayhew, and 3,070,326, granted Dec. 25, 1962, to A. A. Griffith each disclose a configuration in which one aircraft is launched from a position on top of another aircraft. U.S. Pat. Nos. 2,883,125, granted Apr. 21, 1959, to A. J. Jarvis et al, 2,998,208, granted Aug. 29, 1961, to J. Di Perna, and 3,006,576, granted Oct. 31, 1961, to E. A. Elijah each disclose a configuration in which an escape aircraft is mounted on top of another aircraft. N. L. Crook discloses a configuration in which a separate payload aircraft is carried suspended from a control aircraft in U.S. Pat. Nos. 3,258,228, granted Jun. 28, 1966, and 3,516,624, granted Jun. 23, 1970. Configurations in which a subservient aircraft is carried within and deployed from an interior compartment of a primary aircraft are disclosed in U.S. Pat. Nos. 3,567,156, granted Mar. 2, 1971, to D. L. Bauer, and 3,703,998, granted Nov. 28, 1972, to P. F. Girard. U.S. Pat. Nos. 2,876,677, granted Mar. 10, 1959, to J. R. Clark et al, and 3,000,593, granted Sept. 19, 1961, to G. Eggers et al each disclose a configuration in which a body such as a missile or a drone is mounted on a wing of an aircraft. U.S. Pat. No. 3,419,234, granted Dec. 31, 1968, to A. G. Poirier discloses a system in which a rescue aircraft lowers a coupling that engages the top of a damaged aircraft to transfer people from the damaged aircraft to the rescue aircraft. U.S. Pat. Nos. 2,981,499, granted Apr. 25, 1961, to R. B. Janney II, and 4,267,987, granted May 19, 1981, to W. R. McDonnell each disclose a system in which one aircraft is used to assist another aircraft in taking off. The Janney patent discloses a catapult launch vehicle that engages the underside of the vehicle to be launched. The McDonnel patent discloses a system in which an airborne helicopter engages the top of an airplane to enable the airplane to take off either vertically or with a very short ground run.

U.S. Pat. No. 2,399,217, granted Apr. 30, 1946, to D. S. Fahrney discloses a system in which smaller aircraft are mounted to underside portions of the wings or belly of a carrier glider for transport. An aircraft is lifted into and lowered from its stowed position by a cable and pulley arrangement that operates a trapeze. U.S. Pat. No. 2,621,000, granted Dec. 9, 1952, to R. A. Robert discloses a system in which a high speed aircraft is linked to a carrier aircraft and is launched from the carrier aircraft. In the launch procedure, the speed of the carrier engine is increased and the power of the high speed aircraft is simultaneously adjusted, and then the locking device that secures the two aircraft together is released to allow the high speed aircraft to separate from the carrier under its own power at a lower speed than the carrier. The two aircraft may be linked in flight for refueling the smaller high speed aircraft. U.S. Pat. No. 4,451,017, granted May 29, 1984, to W. R. Marshall discloses a three stage rocket vertical launch vehicle in which propellants are fed from one stage to another to enable the vehicle to parallel stage its use of engines and components.

U.S. Pat. No. 2,481,542, granted Sept. 13, 1949, to G. L. Schuyler discloses a device for displacing a projectile from a bomb bay a safe distance before the projectile is allowed to fall freely or is ignited. The projectile is attached to the forked outer ends of displacing arms by attaching pins. The inner ends of the displacing arms are pivotably mounted to the fuselage within the bomb bay. The projectile is pivotably moved into a lowered position by a cable mechanism or by the action of gravity. Following the lowering of the projectile, the latching pins are released and then the projectile is ignited.

West German Pat. No. 2,306,811, granted to E. Foell, and laid open on Aug. 14, 1974, discloses a composite aircraft in which a carrier aircraft has a fuselage and wings that define a free space for receiving a carried flight device. The outside surfaces of the flight device complement the shaping of the carrier aircraft and at least partially increase the carrier's lift surface. In one embodiment, shown in FIG. 4 of the Foell patent, the front section of the flight device fits into and "grips" the fuselage of the carrier. The carrier has a relatively short fuselage and strongly swept-back wings. The flight device completes the wings of the carrier into a delta wing.

Launching systems for shuttle craft are disclosed in an article by Curtis Peebles, entitled "Air-Launched Shuttle Concepts", in the April 1983 issue of the Journal of the British Interplanetary Society, Vol. 36, No. 4. Each of the shuttle concepts discussed in the article include a first stage aircraft capable of taking off from a conventional runway and a second stage that goes into orbit after separation. A Soviet system is described as having a high speed separation in the order of Mach 6 or 7. The article also describes a U.S. Air Force proposal having a modified Boeing 747 launch vehicle and a "comparatively low" separation altitude and velocity. With regard to separation velocity, it should be noted that the Jackson et al. patent cited above describes a system in which the separation velocity is about Mach 0.8, and Jackson et al. also mention that separation velocities in the range of Mach 2 to Mach 3.5 would require higher development costs but would yield lower recurring operating costs.

The known systems and the patents discussed above and the prior art cited in such patents should be carefully considered in order to put the present invention into proper perspective relative to the prior art.

DISCLOSURE OF THE INVENTION

A subject of the present invention is a horizontal-takeoff transatmospheric launch system. According to an aspect of the invention, the system comprises first and second stages including an aircraft and a transatmospheric vehicle, respectively. The aircraft has exterior surface portions that define a cavity opening onto bottom and aft portions of the aircraft. This cavity is dimensioned to receive the transatmospheric vehicle to integrate the vehicle into the underside of the aircraft. The system also includes means for releasably connecting the stages together, with the vehicle integrated into the underside of the aircraft, prior to takeoff, and for releasing the stages from each other during flight to allow each stage to continue independently on its own separate flight path.

A feature of the invention is the provision of each of the stages with landing gear arranged to make it possible to quickly and easily integrate the transatmospheric vehicle into the underside of the aircraft. The landing gear of each stage comprises a plurality of wheels for rolling the respective stage on the ground. The landing gear of the two stages is positioned and dimensioned so that, when each stage is supported on the ground on its respective landing gear, the second stage may be rolled on the wheels of its landing gear into a position in the cavity in which it is substantially integrated into the underside of the aircraft. This arrangement contributes greatly to minimizing the turn around time for the launch system and to making it possible to launch the transatmospheric vehicle on short notice. In addition, the arrangement makes it possible to integrate the transatmospheric vehicle into the aircraft without lifting the vehicle and without any need for elaborate mounting equipment.

Another feature of this invention is means for releasably connecting and releasing said stages that comprises a plurality of struts. Each strut has a first end pivotably connected to the aircraft and a second end pivotably connected to the transatmospheric vehicle The means for releasably connecting and releasing also includes means for releasably securing the vehicle against pivotal movement relative to the aircraft.

Preferably, each of the stages is provided with a rocket engine, and the means for releasably connecting and releasing includes means for automatically pivoting the stages away from each other in response to a thrust differential between the first and second stage rocket engines. In embodiments in which the means for releasably connecting and releasing includes a plurality of struts, the struts are preferably positioned to automatically pivot the stages away from each other in response to such a thrust differential.

Whenever each of the stages is provided with a rocket engine, it is preferable to also provide means for cross-feeding rocket fuel from the first stage to the second stage to ensure that the second stage carries a maximum amount of rocket fuel when the stages separate. A system with such cross-feeding means would generally also include means for disconnecting the cross-feeding means just prior to separation of the two stages.

According to another aspect of the invention, the launch system comprises first and second stages including an aircraft and a transatmospheric vehicle, respectively. Each stage includes a rocket engine The system has means for releasably connecting the stages together prior to takeoff, and for releasing the stages from each other during flight to allow each stage to continue independently on its own separate flight path. This means includes a plurality of struts each of which has a first end pivotably connected to the aircraft and a second end pivotably connected to the transatmospheric vehicle The struts are positioned to automatically pivot the stages away from each other in response to a thrust differential between the first and second stage rocket engines.

Preferably, the means for releasably connecting and releasing also includes means for automatically disconnecting the second end of each strut from the transatmospheric vehicle upon a predetermined amount of pivotal movement of the vehicle with respect to the aircraft. In the preferred embodiment, the second end of each strut defines a generally longitudinal slot with an open end. The vehicle has a plurality of pins mounted thereon. Each of these pins is received into one of the slots to connect the vehicle to the respective strut. The pins and slots are positioned and dimensioned so that the pins will automatically slide out of the open ends of the slots upon a predetermined amount of pivotal movement of the vehicle with respect to the aircraft, to automatically release the vehicle from the aircraft. This arrangement has the advantages of being relatively easy and inexpensive to manufacture and of providing an essentially fail-safe release of the vehicle from the struts.

Another subject of the invention is a method of launching a transatmospheric vehicle. According to an aspect of the invention, the method comprises providing an aircraft of the type having an air breathing engine and providing the aircraft with a cavity opening onto bottom and aft portions of the aircraft. The transatmospheric vehicle is integrated into the underside of the aircraft by moving the vehicle into the cavity. The aircraft and the vehicle are releasably connected together. The vehicle is releasably secured in a position in the cavity in which it is integrated into the underside of the aircraft. The air breathing engine of the aircraft is operated to accomplish a horizontal takeoff of the integrated aircraft and vehicle. The integrated aircraft and vehicle are flown to a predetermined velocity and altitude. Upon reaching such predetermined velocity and altitude, the aircraft and vehicle are released from each other, and the aircraft and vehicle are flown independently of each other.

Preferably, the method further comprises providing each of the aircraft and the vehicle with a rocket engine, and the flying to a predetermined velocity and altitude includes igniting these rocket engines and climbing to such predetermined velocity and altitude. Also preferably, while flying to such velocity and altitude and before igniting the rocket engines, the air breathing engine is operated and the aircraft is turned as necessary to orient the vehicle into a desired orbit inclination and to offset the vehicle to a desired azimuth. This feature of turning the aircraft under air breathing engine power makes it possible to attain the flexibility in choice of orbit without time or weight penalties that is a major goal of the invention.

The step of releasing the aircraft and the vehicle from each other may be accomplished in a number of ways. Preferably, the thrust of the aircraft rocket engine is reduced to provide a thrust differential between the aircraft rocket engine and the rocket engine of the transatmospheric vehicle. The thrust differential is allowed to cause the aircraft and the vehicle to pivot away from each other. This manner of releasing the vehicle has the advantages of operating almost automatically and of making separation possible without the need for a power source other than the rocket engines.

It is of course preferable that the transatmospheric vehicle have full or nearly full fuel tanks when it separates from the aircraft. Therefore, whenever the rocket engine of such vehicle is operated before separation, the method preferably includes cross-feeding rocket fuel from the aircraft to the vehicle to ensure that the vehicle carries a maximum amount of rocket fuel when the aircraft and the vehicle separate. This helps to maximize the vehicle's capabilities in attaining orbit and in carrying out its mission once the desired orbit has been reached.

According to another aspect of the invention, the method comprises providing an aircraft of the type having landing gear and an air breathing engine and providing the aircraft with a cavity opening onto bottom and aft portions of the aircraft. The transatmospheric vehicle is provided with landing gear. Each of the aircraft and the vehicle is supported on the ground on its landing gear, and the aircraft and vehicle are aligned with the vehicle spaced aftwardly of the aircraft. While maintaining the aircraft and the vehicle so supported and aligned, the vehicle is moved forwardly toward the aircraft and into the cavity. The aircraft and vehicle are releasably connected together and the vehicle is releasably secured in position in the cavity, to integrate the vehicle into the underside of the aircraft. The air breathing engine is operated to accomplish a horizontal takeoff of the integrated aircraft and vehicle. The integrated aircraft and vehicle are flown to a predetermined velocity and altitude. Upon reaching such velocity and altitude, the aircraft and vehicle are released from each other and flown independently of each other.

The transatmospheric vehicle is preferably moved into the cavity by being towed with a ground vehicle. This procedure is simple and easy to carry out and does not require any equipment other than that normally found on an airfield. After the aircraft and transatmospheric vehicle have been connected together and the vehicle has been secured in position and before the integrated aircraft and vehicle takes off, the landing gear of the transatmospheric vehicle may be retracted. This makes it possible for the integrated aircraft and vehicle to take off on the landing gear of the aircraft alone. Thus, the landing gear of the transatmospheric vehicle is used only for landing such vehicle when it is separated from the aircraft, and the vehicle landing gear need only meet the structural requirements for such separate landings.

According to another aspect of the invention, the method comprises providing an aircraft of the type having an air breathing engine and releasably connecting the aircraft and the transatmospheric vehicle together. The air breathing engine is operated to accomplish a horizontal takeoff of the connected aircraft and vehicle. The connected aircraft and vehicle are flown to a Mach number of about 2.5 to about 3.5 and an altitude sufficient to allow the vehicle to accomplish a predetermined mission. Upon reaching such Mach number and altitude, the aircraft and vehicle are released from each other and flown independently of each other. Maintaining the staging velocity in a range corresponding to a Mach number of about 2.5 to about 3.5 avoids the high staging Mach numbers of about Mach 10 characteristic of known systems and the consequent need for providing the aircraft with a structure capable of withstanding the high heating rates associated with such high Mach numbers. It is possible to build an aircraft capable of withstanding a staging Mach number not exceeding about 3.5 using known technology. Therefore, the design costs of such an aircraft may be kept at a minimum, and the aircraft may be made operational in the relatively near future.

Still another subject of the invention is a method of launching a transatmospheric vehicle of the type having a rocket engine. According to an aspect of the invention, the method comprises providing an aircraft and providing the aircraft with a rocket engine and a plurality of struts. Each of the struts has a first end pivotably connected to the aircraft. A second end of each strut is pivotably connected to the transatmospheric vehicle, and the vehicle is releasably secured against pivotal movement relative to the aircraft. The aircraft and secured vehicle are flown to a predetermined Mach number and altitude. This flying of the aircraft and vehicle includes igniting the rocket engines of the aircraft and the vehicle. The thrust of the aircraft rocket engine is reduced to provide a thrust differential. The thrust differential is allowed to cause the aircraft and the vehicle to pivot away from each other. Then one end of each strut is released to allow the aircraft and vehicle to separate from each other and fly independently.

The method and apparatus of the present invention solve the problems discussed above in connection with vertical takeoff systems and known proposals for horizontal takeoff systems. The method and apparatus of the invention do not require the kind of complex, heavy, and expensive ground support equipment that is necessary to operate a vertical takeoff system. The ground support equipment required by the method and apparatus of the invention is relatively minimal and may conveniently and economically be made readily available at a large number of takeoff sites. The type of ground support equipment required, the physical characteristics of the two stages of the system, and the method of takeoff make it possible to accomplish a launch using the system of the invention from virtually any of the numerous major airports in the United States and other countries. The practicality of taking off from such airports is enhanced by the use of air breathing, turbojet engines for takeoff since, compared to known launch systems, such engines significantly reduce the noise and sonic boom effects on the airport and its environs.

The ability to use a large number of airports, in combination with the maneuvering capability of the aircraft before separation, gives the system almost unlimited flexibility in choice of orbit without incurring any time or weight penalties. From a given location, the transatmospheric vehicle may be launched into any orbit inclination and a wide range of azimuths. The offset capability to a desired azimuth can be further increased simply by ferrying the connected aircraft and transatmospheric vehicle from one airport to another, refueling, and then commencing the launch procedure.

The method and apparatus of the invention make it possible to launch a transatmospheric vehicle on very short notice. Because of its simplicity and ease of operation, the launching process itself requires a minimum amount of time. In addition, the lack of a need for elaborate ground support equipment and the easy mobility of the two stages make it possible to economically maintain the two stages ready for the launching process at all times and to rapidly ferry them to a desired launch site when the need arises. The rapid launch capability of the system is further enhanced by its relatively short turn around time. After separating from the orbit vehicle, the aircraft lands at an airfield and can be prepared for a subsequent launch of the same or a different transatmospheric vehicle in a minimum amount of time.

The method and apparatus of the invention also provide significant reductions in the cost of maintaining a launch system. The system of the invention is designed to provide two stages that are both totally recoverable and reusable with a minimum amount of maintenance and refurbishment. Thus, the recurring costs are greatly reduced. The method and apparatus of the invention are also designed to make it possible for the first stage and at least most of the second stage to be constructed using existing technology. This not only reduces projected development costs but also makes a relatively near projected completion date realistic.

The invention also makes it possible to attain the very important goal of providing the capacity to launch a positive payload in a horizontal takeoff system. This capacity for launching a positive payload, in combination with the other advantages of the system of the invention discussed above, makes the system of the invention highly suitable for accomplishing a wide range of missions Such missions include both commercial and military missions, from routine missions that are scheduled well in advance to emergency triggered missions that must be carried out on very short notice.

The system of the invention is described above as preferably including the feature of providing each of the aircraft and the transatmospheric vehicle with a rocket engine. This feature is included in the first preferred embodiment of the invention. In other embodiments of the invention, there may be other arrangments and types of engines. For example, in the second preferred embodiment of the invention, the main engine of the transatmospheric vehicle is a scramjet, rather than a rocket engine.

The second preferred embodiment may include the additional features discussed above and has substantially the same advantages discussed above. The choice between the two embodiments would depend on a number of factors. The major advantage of the first preferred embodiment over the second embodiment is that rocket engine technology is more highly developed than scramjet technology, and therefore, development costs of the first embodiment would be lower and an earlier completion date for the first embodiment could be attained. One of the advantages of the second preferred embodiment over the first embodiment is that the second embodiment makes it possible to optimize the speed and trajectory for each type of engine. In addition, the second preferred embodiment has the potential for increasing the payload capacity of the system. Although a scramjet engine is generally heavier than a rocket engine, the overall system using a scramjet would be lighter than a system using a rocket engine because the scramjet obtains oxygen for combustion from the surrounding atmosphere whereas liquid oxygen must be carried by a rocket engine powered vehicle.

In order to optimize the speed and trajectory for each type of engine, the method of launching a transatmospheric vehicle preferably comprises providing an aircraft of a type having an air breathing engine, providing the aircraft with a rocket engine, and providing the transatmospheric vehicle with a scramjet engine. The aircraft and transatmospheric vehicle are releasably connected, and the air breathing engine is operated to accomplish a horizontal takeoff of the connected aircraft and vehicle. After takeoff, the method includes igniting the rocket engine and accelerating to a Mach number of about 3.3 and climbing to an altitude sufficient to allow the transatmospheric vehicle to attain orbit and accomplish a predetermined mission. While the connected vehicles are accelerating and climbing, the scramjet engine is ignited. Upon reaching said Mach number and altitude, the aircraft and vehicle are released from each other and flown independently of each other.

A method aspect of the invention discussed above includes supporting the transatmospheric vehicle on its landing gear and moving it forwardly toward the aircraft and into the cavity in the aircraft. This aspect of the invention preferably further includes retracting the landing gear of the transatmospheric vehicle after connecting the aircraft and vehicle together and securing the vehicle in position, fueling the vehicle by crossfeeding fuel from the aircraft to the vehicle after retracting the landing gear of the vehicle, and operating the air breathing engine to accomplish takeoff after fueling the vehicle. These steps enhance the advantage of minimizing the structural requirements for the landing gear of the vehicle. Such landing gear need only be sized for rolling the vehicle on the ground and landing the vehicle when the vehicle is not carrying the weight of fuel. This minimizes the structural requirements for the landing gear and, thus, makes it possible to minimize the weight of the landing gear. This preferred procedure also helps to further simplify launch preparation and reduce turn around time.

These and other advantages and features of the invention will become apparent from the detailed description of the best modes for carrying out the invention that follows.

BRIEF DESCRIPTION OF THE DRAWINGS

In the drawings, like element designations refer to like parts throughout, and:

FIG. 4 is a top plan view of the booster aircraft.

FIG. 5 is a top plan view of the orbiter vehicle.

FIG. 6 is an elevational view of the booster aircraft with the orbiter vehicle integrated into its underside.

FIG. 11/is an elevational view of the booster aircraft and orbiter vehicle at the beginning of the takeoff operation.

FIG. 12 is an elevational view of the booster aircraft and orbiter vehicle at ignition of the booster aircraft and orbiter vehicle rocket engines.

FIG. 13 is an elevational view of the booster aircraft and orbiter vehicle as the orbiter vehicle is swinging out of the cavity in the booster aircraft.

FIG. 14 is a detail of one of the strut ends shown in FIG. 13.

FIG. 15 is an elevational view of the booster aircraft and orbiter vehicle just after separation.

FIG. 16 is a detail of one of the strut ends and associated pins shown in FIG. 15.

FIG. 18 is a side elevational view of a second preferred embodiment of the booster aircraft and orbiter vehicle integrated together.

FIG. 19 is a rear elevational view of the aircraft and vehicle shown in FIG. 18.

FIG. 20 is a top plan view of the aircraft and orbiter shown in FIGS. 18 and 19.

FIG. 21 is a side elevational view of the orbiter vehicle shown in FIGS. 18 and 19.

FIG. 22 is a top plan view of the vehicle shown in FIG. 21.

FIG. 23 is a vertical sectional view of a portion of the vehicle shown in FIGS. 21 and 22, including its scramjet engine.

BEST MODES FOR CARRYING OUT THE INVENTION

Figure 1:
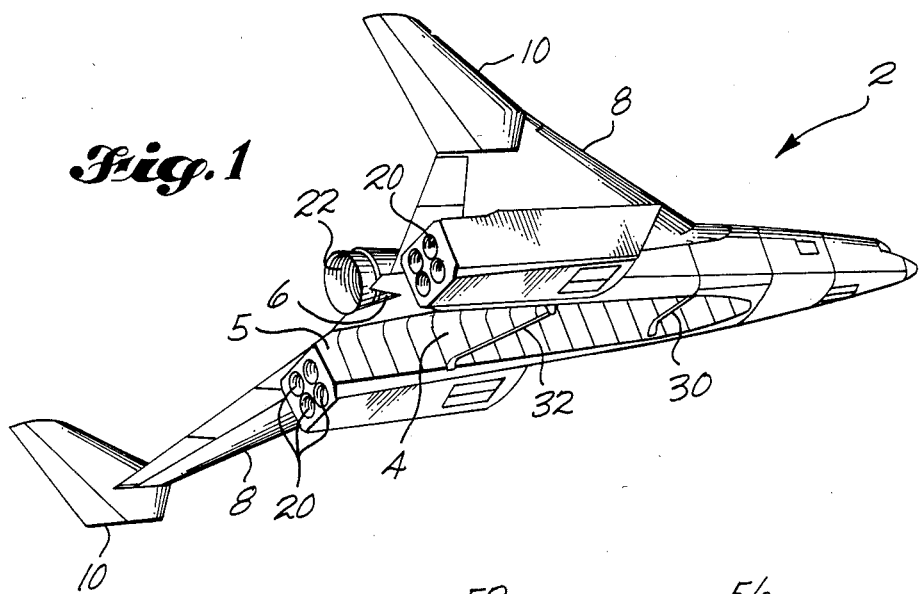
FIG. 1 is a pictorial view of the booster aircraft flying by itself.
Figure 2:
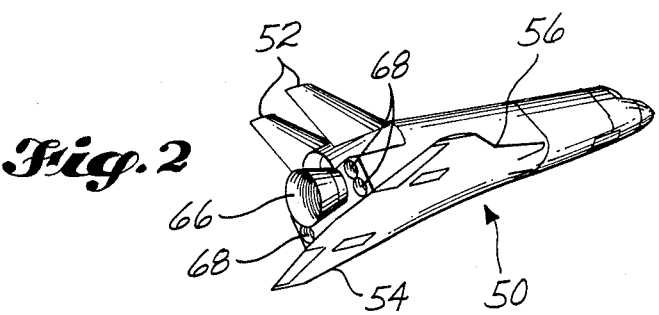
FIG. 2 is a pictorial view of the orbiter vehicle flying by itself..
Figure 3:
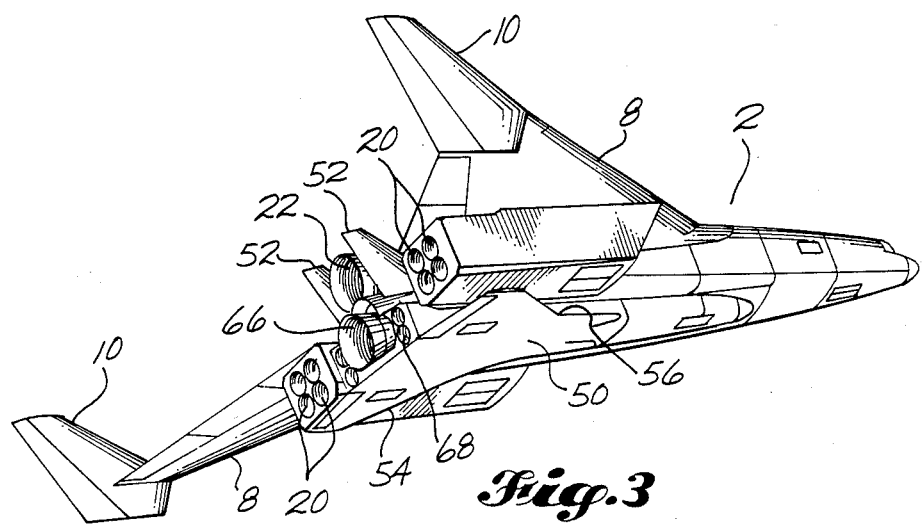
FIG. 3 is a pictorial view of the booster aircraft flying with the orbiter vehicle integrated into its underside.

The drawings show two embodiments of a horizontal-takeoff transatmospheric launch system that are constructed according to the invention and that also constitute the best modes of the invention currently known to the applicant. In addition to showing the apparatus of the invention, the drawings illustrate the best modes of the method of the invention currently known to the applicant. The system of the invention is a two-stage launch system in which a transatmospheric orbiter vehicle is releasably connected to a booster aircraft for a horizontal takeoff. Following takeoff, the booster carries the orbiter to a staging altitude and velocity at which the booster and orbiter are separated. Following separation, the booster makes a conventional horizontal landing and the orbiter continues on to its transatmospheric mission. Upon completing its mission, the orbiter reenters the atmosphere and makes an unpowered conventional horizontal landing.

In the preferred embodiment, the first stage of the system, the booster aircraft 2, is designed for a two-person crew. The aircraft 2 has a delta wing 8 that is mounted high on the fuselage to provide clearance for the second stage, the transatmospheric orbiter vehicle 50. A vertical tail 10 is mounted on each wing tip of the aircraft 2 to provide directional stability. The fuselage of the aircraft 2 has a cavity 4 that opens onto bottom and aft portions of the fuselage. The cavity 4 is essentially symmetrical about the longitudinal centerline of the aircraft 2. The cavity 4 is defined by exterior surfaces of the aircraft 2 including the underside of the center portion of the wing 8 and a generally U-shaped, generally vertical wall 5. The cavity 4 is dimensioned to receive the transatmospheric vehicle 50 to integrate the vehicle 50 into the underside of the aircraft 2. The wing 8 is provided with two slots 6 to accommodate the vertical tails 52 of the vehicle 50.

The aircraft 2 is powered by eight air breathing engines 20. These engines 20 are mounted in two pods of four engines 20 each. The pods are positioned outboardly of the cavity 4 on either side of the cavity 4. The engines 20 are of an advanced type that provides augmented air breathing power. An example of a suitable engine for use in the aircraft 2 is the engine made by the General Electric Company and having a model number of F101-GE-102. The augmented power will be supplied by afterburners which in turn supply augmented thrust. The air breathing fuel tanks 21 are located in the outboard portions of the wing 8 to reduce the total wing bending moments at the side of the body.

The aircraft 2 is also provided with a rocket engine 22. This engine 22 is located above the aft portion of the cavity 4. Like the air breathing engines 20, the rocket engine 22 may be of a type currently available. At the present, it is anticipated that the rocket engine will be the existing SSME (space shuttle main engine) currently used on the space shuttle. This engine is made by Rockwell International, Rockadyne Division. The rocket engine 22 uses liquid oxygen/liquid hydrogen propellants. The liquid hydrogen tanks 24 are located in the main portion of the fuselage behind the crew compartment and may be made an integral part of the structure of the aircraft 2. The liquid oxygen tanks 26 are also located in the fuselage just aft of the liquid hydrogen tanks 24. See FIG. 4.

Figure 7:
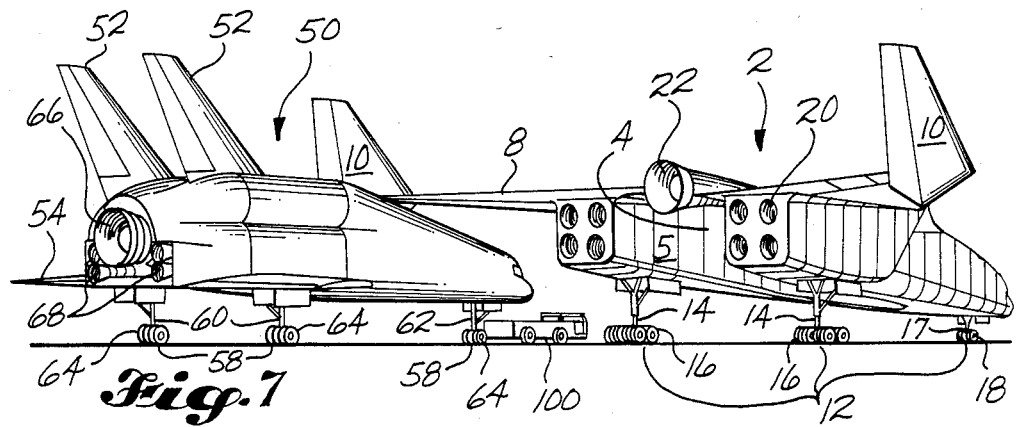
FIG. 7 is a pictorial view showing the booster aircraft and orbiter vehicle on the ground and in alignment ready to be integrated together.
Figure 8:
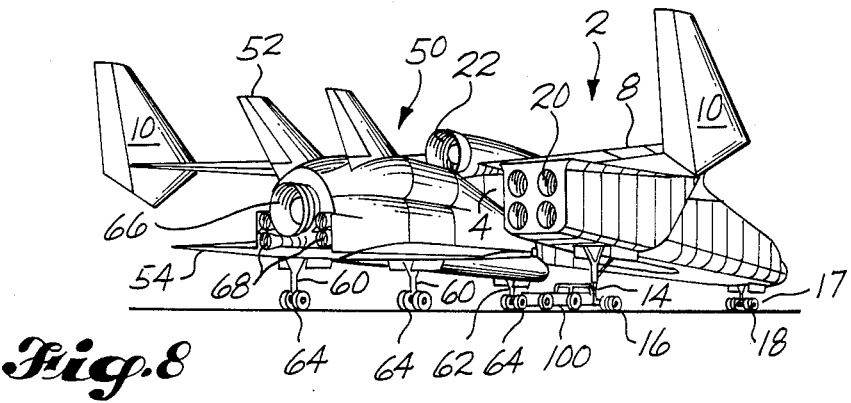
FIG. 8 is like FIG. 7 except that it shows the orbiter vehicle being towed into the cavity in the booster aircraft.
Figure 9:
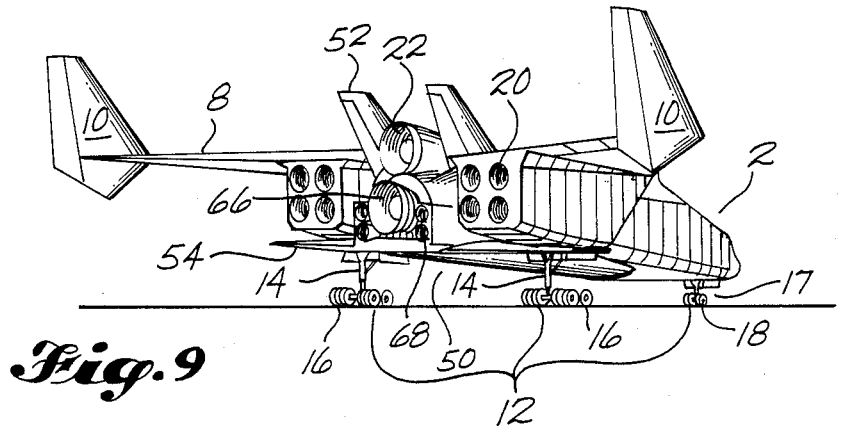
FIG. 9 is like FIG. 8 except that it shows the orbiter vehicle all the way in position in the cavity.

Referring to FIG. 7, the aircraft 2 has landing gear 12 for horizontal takeoffs and landings. The landing gear 12 includes two main struts 14, each of which carries a truck of eight wheels 16. The landing gear 12 also includes a nose gear portion 17 that carries a truck of four wheels 18. The eight wheeled main landing gear units 14, 16 are located outboardly of the cavity 4 and are integral with and retract forwardly into the nacelles on either side of the cavity 4. The nose gear 17 is mounted forward of the liquid hydrogen tanks and retracts rearwards into a position below the liquid hydrogen tanks 24.

The launch system of the invention in general, and the aircraft 2 in particular, are designed so that the aircraft 2 may be manufactured using known technology. It is anticipated that most of the structure of the aircraft 2 will be made from composite materials such as graphite/epoxy and graphite/polyimide. Portions of the aircraft 2, such as the liquid oxygen and liquid hydrogen tanks, will preferably be made from aluminum. Surfaces of the aircraft, like the tip of the nose and the leading edges of the wing, that will be subjected to a high level of thermal stress may be provided with titanium for thermal stress relief.

The orbiter vehicle 50 is also designed for a two-person crew. The vehicle 50 of the preferred embodiment has a delta wing 54 that is mounted low on the body of the vehicle 50 to facilitate mating with the aircraft 2. Each side of the wing 54 has a "break" 56 (a change in the planform angle of the leading edge) in order to provide clearance for the aircraft main landing gear 14, 16 when the aircraft 2 and vehicle 50 are mated. The vehicle 50 has twin vertical tails 52 for directional stability. These tails 52 are mounted on the aft end of the body.

The vehicle 50 is powered by a rocket engine 66 that is mounted on the aft end of the body, as is most clearly shown in FIGS. 2 and 7-9. This engine 66, like the rocket engine 22 of the aircraft 2, may be the existing SSME currently used on the space shuttle. The vehicle 50 also has four orbital maneuvering rocket engines 68, two mounted on each side of the main rocket engine 66. Engines suitable for use as the orbital maneuvering rocket engines 68 are currently in use. These are the model RL-10 engines manufactured by Pratt Whitney of United Aircraft. The engines 66, 68 of the vehicle 50 use liquid hydrogen and liquid oxygen propellants. The liquid hydrogen is carried in a forward tank 72 located in the body of the vehicle 50 just aft of the nose, and two saddle tanks 74 located aft of the forward tank 72 and on either side of the payload bay 70. The liquid oxygen tanks 76 are provided as an integral part of the two sides of the delta wing 54. See FIG. 5.

The vehicle 50 is provided with landing gear 58 for horizontal landings. The landing gear 58 includes two main struts 60 that are mounted on and retracted into the wing structure. The gear 58 also includes nose gear 62 located below the crew compartment. Each of the three elements of the gear 58 is provided with two wheels 64. The main landing gear 60 is sized for landing weights only. See FIG. 7.

As noted above, in the preferred embodiment the orbiter vehicle 50 is received into the cavity 4 in the aircraft 2 and integrated into the underside of the aircraft 2 for transport to the staging velocity and altitude. The vehicle 50 is connected to the aircraft 2 in an underslung manner in order to eliminate the need for ground support mating equipment and to facilitate separation of the vehicle 50 from the aircraft 2. The vehicle 50 is releasably connected to the aircraft 2 by means of a plurality of struts 30, 32. In the preferred embodiment shown in the drawings, there are four struts 30, 32, two forward struts 30 and two aft struts 32, one forward strut 30 and one aft strut 32 on each side of the cavity 4. However, the number of struts may of course be varied without departing from the spirit and scope of the invention. Each strut 30, 32 has a first end 34 that is pivotably connected to the aircraft 2 inside the cavity 4 at a location near the juncture of the underside of the center portion of the wing 8 and the U-shaped wall 5. When the vehicle 50 is moved into position in the cavity 4, a second end 36 of each strut 30, 32 is pivotably and releasably connected to the vehicle 50. Releasable latches 38 hold the struts 30, 32 in the mated position to secure the vehicle 50 against pivotal movement relative to the aircraft 2 until separation is to be accomplished. See FIG. 6. These latches 38 may be of various known types, such as a collet restrained latch. Each strut 30, 32 is provided with an actuator 44 that serves to retract the strut 30, 32 back into the cavity 4 following separation of the vehicle 50 from the aircraft 2. The actuators 44 may take any of a variety of known forms.

The separation procedure includes the pivoting of the vehicle 50 out of the cavity 4. The vehicle 50 pivots on the struts 30, 32. When the vehicle has pivoted to a position in which the struts 30, 32 are essentially perpendicular to the longitudinal center lines of both the vehicle 50 and the aircraft 2, the vehicle 50 is released from the struts 30, 32 and separation is complete. Preferably, the second ends 36 of the struts 30, 32 are automatically disconnected from the vehicle 50. The preferred means for accomplishing this automatic disconnection is shown in FIGS. 14 and 16. The second end 36 of each strut 30, 32 is provided with a generally longitudinal slot 40 having an open end. A plurality of pins 42, one corresponding to each strut 30, 32, are mounted on the vehicle 50. Each pin 42 is received into the slot 40 in the corresponding strut 30, 32 when the vehicle 50 is connected to the aircraft 2. The pins 42 and slots 40 are positioned and dimensioned so that the pins 42 will automatically slide out of the open ends of the slots 40 when the vehicle 50 has completed its pivotal movement with respect to the aircraft 2 out of the cavity 4. When the pins 42 slide out of the slots 40, the vehicle 50 is automatically released from the aircraft 2 and is free to proceed independently to its orbital mission.

Figure 17:
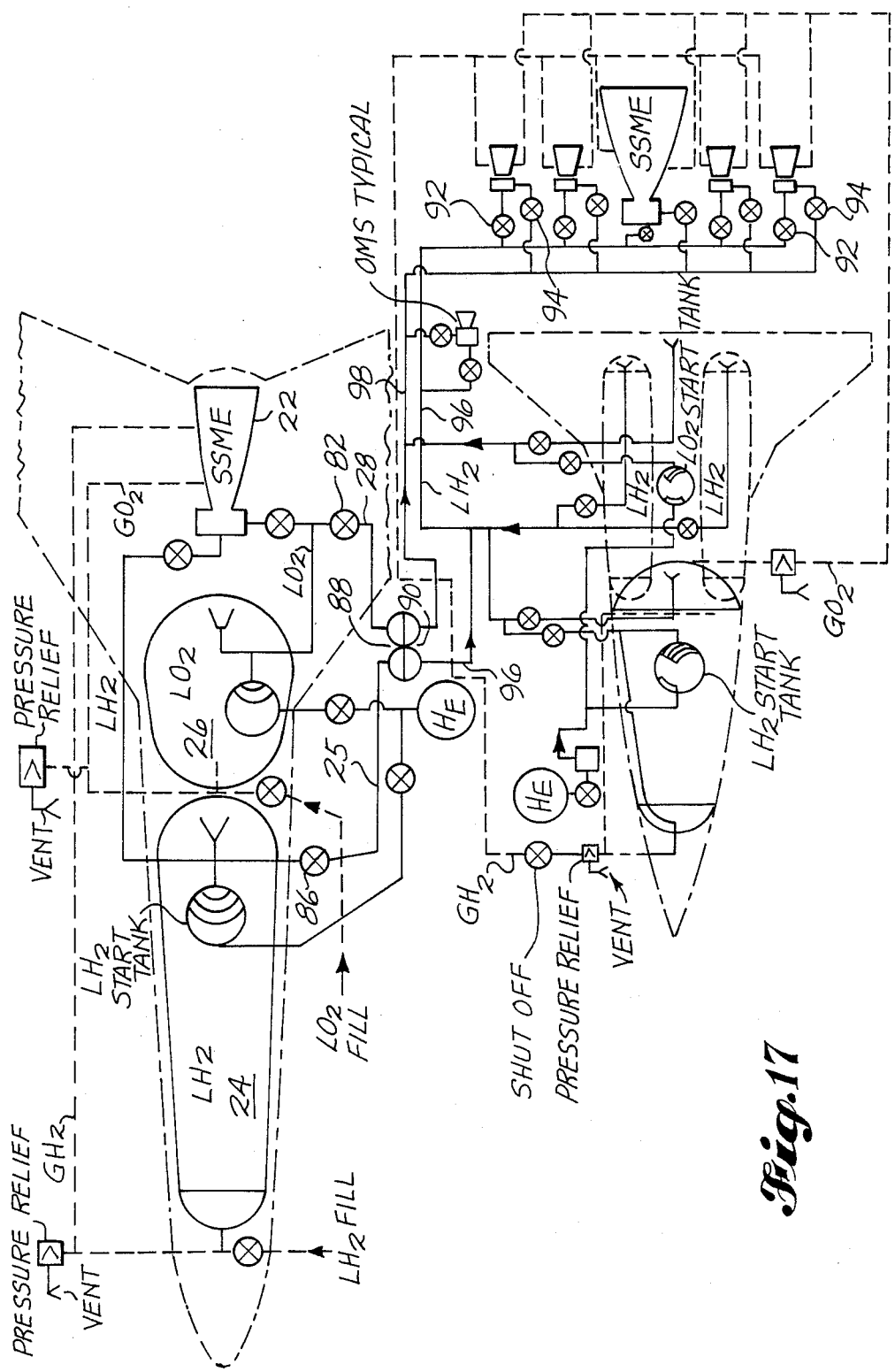
FIG. 17 is a schematic representation of the fuel systems of the booster aircraft and the orbiter vehicle and their interconnection.

In addition to the structural connection between the aircraft 2 and the vehicle 50 provided by the struts 30, 32, before separation the fuel systems of the aircraft 2 and vehicle 50 are interconnected to provide cross-feeding of rocket fuel from the aircraft 2 to the vehicle 50. This cross-feeding ensures that the vehicle 50 has essentially full fuel tanks and carries a maximum amount of rocket fuel when the two stages 2, 50 separate. FIG. 17 is a schematic view of the rocket fuel systems of the aircraft 2 and vehicle 50 and the cross-feeding means.

As can be seen in FIG. 17, a fuel line 25 from the aircraft liquid hydrogen tanks 24 communicates with a conduit in a coupling 88 for transfer to the vehicle 50 This coupling 88 is located on an exterior surface in the cavity 4. A shut-off valve 86 is provided to seal off the line 25 when the separation procedure commences. Similarly, a fuel line 28 from the liquid oxygen tanks 26 communicates with a separate conduit in the coupling 88 for transfer to the vehicle 50 Line 28 has a shut-off valve 82. The coupling 88 on the aircraft 2 mates with a coupling 90 on an exterior surface of the vehicle 50. Together, couplings 88, 90 form a releasable connection which may be of various known types, such as a poppet valve connection with restraints. Conduits 96, 98 from the coupling 90 feed the fuel to the main rocket engine 66 of the vehicle 50. These conduits are provided with shut-off valves 92, 94 to close off the coupling 90 when the vehicle 50 is separated from the aircraft 2.

In operation, each of the aircraft 2 and vehicle 50 is towed onto a preparation pad at an airfield launch site. The aircraft 2 and vehicle 50 are supported on their respective landing gear 12, 58, and their longitudinal center lines are aligned with the vehicle 50 spaced aftwardly of the aircraft 2. See FIG. 7. While maintaining the aircraft 2 and vehicle 50 aligned and supported on their landing gear 12, 58, the vehicle 50 is towed forwardly by a ground tow vehicle 100 toward the aircraft 2 and into the cavity 4. See FIG. 8. In order to facilitate the mating of the aircraft 2 and vehicle 50, the landing gear 12, 58 is positioned and dimensioned so that when each stage 2, 50 is supported on the ground on its respective landing gear 12, 58, the orbiter vehicle 50 may be rolled on the wheels 64 of its landing gear 58 directly into a position in the cavity 4 in which it is substantially integrated into the underside of the aircraft 2. Thus, the vehicle 50 need only be rolled into position, and no ground support equipment for lifting the vehicle 50 is required When the vehicle 50 has been rolled into the cavity 4, the vehicle 50 is releasably connected to the aircraft 2 by sliding the pins 42 into the slots 40 on the outer ends 36 of the struts 30, 32. The vehicle 50 is releasably secured in position in the cavity 4 by the latches 38 mentioned above, and the cross-feed couplings 88, 90 are connected. The vehicle 50 is then fully integrated into the underside of the aircraft 2, and the landing gear 58 of the vehicle 50 may be retracted See FIG. 9.

Figure 10:
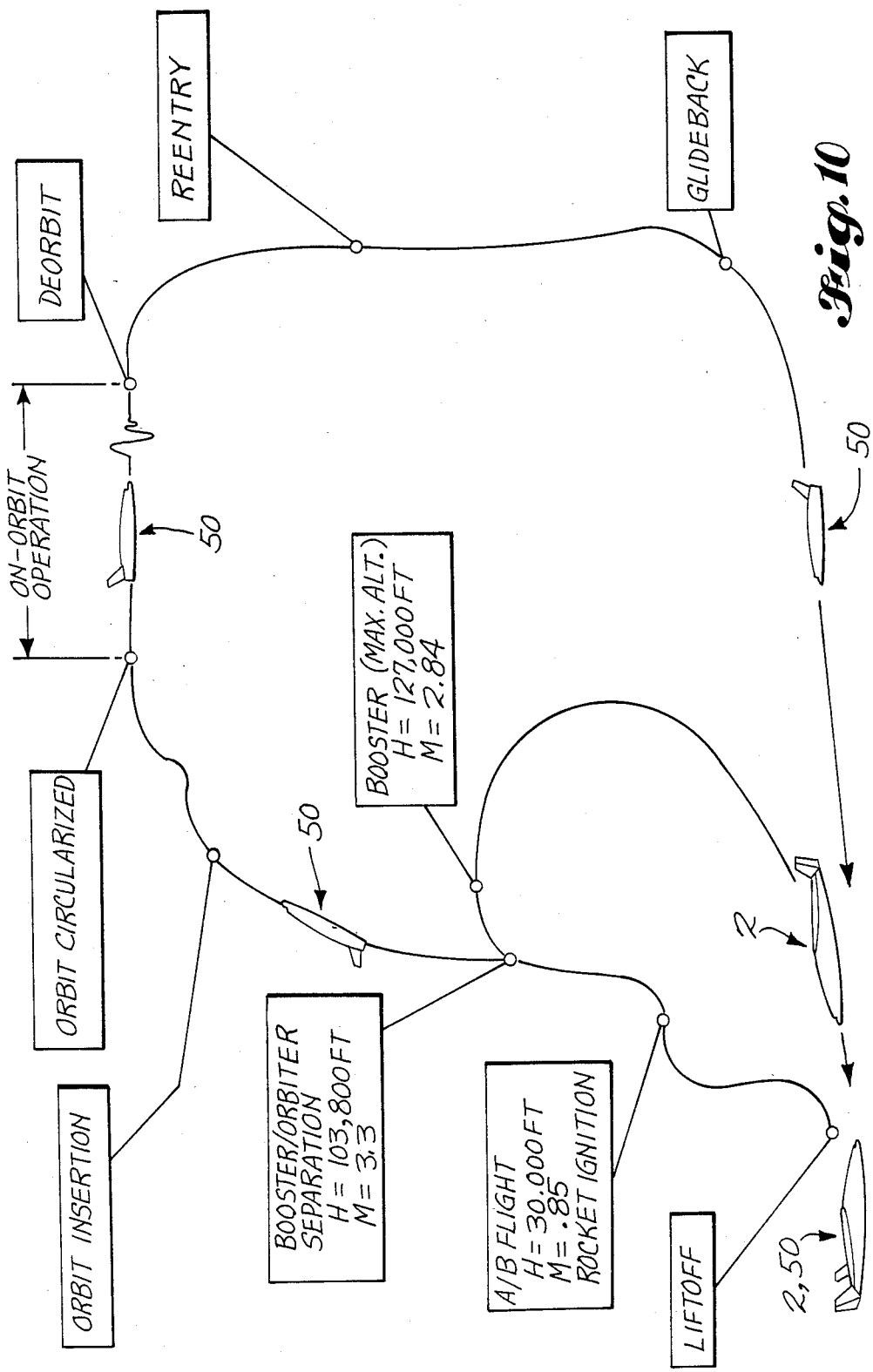
FIG. 10 is a schematic representation of the flight profiles of the booster aircraft and orbiter vehicle.

With the landing gear of the vehicle 58 retracted, the integrated aircraft 2 and vehicle 50 is rolled on the landing gear 12 of the aircraft 2 onto a runway for a conventional horizontal takeoff. See FIG. 11. FIG. 10 illustrates in schematic form the flight paths of the integrated aircraft 2 and vehicle 50 and of each independent stage 2, 50 after separation. Following takeoff, the aircraft 2 is operated like a conventional aircraft. Under air breathing engine power, the aircraft is turned as necessary to orient the vehicle 50 into a desired orbit inclination and to offset the vehicle 50 to a desired azimuth As discussed above, this maneuvering operation provides the launch system with flexibility in choice of orbit without time or weight penalties. In addition, the maneuvering under air breathing power is far more efficient than maneuvering under rocket power would be and permits the desired orbit to be attained without the expenditure of any rocket fuel.

The aircraft 2, with the orbiter vehicle 50 integrated into its underside, flies under air breathing power to an altitude of, for example, 30,000 feet and a Mach number of about 0.85. With the aircraft 2 oriented at an angle of about 5° to the local horizon, the rocket engines 22, 66 of the aircraft 2 and vehicle 50 are ignited The ignition of the rocket engines 22, 66 is illustrated in FIG. 12. When the engines 22, 66 have been ignited, the aircraft 2 goes into an accelerate climb under air breathing and rocket power. The aircraft 2 climbs to the separation conditions. These conditions must include a Mach number that can be withstood by the structure of the aircraft 2 and an altitude that is sufficient to allow the vehicle 50 to accomplish its transatmospheric mission. Examples of conditions suitable for the preferred embodiment are an altitude of 103,800 feet and a Mach number of 3.3. Upon reaching the separation conditions, the procedure for separating the vehicle 50 from the aircraft 2 is commenced.

The separation procedure is illustrated in FIGS. 13-16. While the orbitor 50 maintains maximum thrust, the rocket engine 22 of the aircraft 2 is step throttled to reduce the thrust of the engine 22; i.e., the engine 22 is gradually shut off. The shut-off is carried out gradually rather than all at once in order to ensure that the shut-off is smooth and that the aircraft 2 and vehicle 50 are not subjected to destabilizing forces caused by a sudden shut-off. The valves 82, 86, 92, 94 in the rocket fuel cross-feeding system are closed. The latches 38 are released to in turn release the struts 30, 32 and the vehicle 50 from any restraint against pivotal movement out of their stowed integrated positions. The couplings 88, 90 are pulled apart and automatically disconnected from each other when the vehicle 50 begins to move away from the aircraft 50.

The reduction in the thrust of the aircraft rocket engine 22 creates a thrust differential between engine 22 and the orbiter main rocket engine 66. The launch system is designed so that the aircraft 2 and vehicle 50 are automatically pivoted away from each other in response to this thrust differential. The struts 30, 32 and their connections to the aircraft 2 and vehicle 50 are positioned so that the vehicle 50 will automatically pivot on the struts 30, 32 in response to the thrust differential. The struts 30, 32 ensure controlled and safe movement of the vehicle 50 with respect to the aircraft 2. FIG. 13 shows the vehicle 50 in the process of pivoting out of the cavity 4. At this point in the operation, the attitude of the two vehicles 2, 50 is at about 33° to the local horizon. FIG. 14 is a detail of the second end 36 of one of the struts 30, 32 shown in FIG. 13. In the position shown in FIGS. 13 and 14, the pin 42 is exerting a pivotal force, a forward and downward force relative to the vehicle 50, on the strut 30, 32.

FIG. 15 shows the positions of the aircraft 2 and vehicle 50 just after the vehicle 50 separates from the struts 30, 32 and the aircraft 2. At separation, the vehicles 2, 50 are essentially parallel to each other, with the struts 30, 32 being perpendicular to the longitudinal axes of the vehicles 2, 50, and separation velocity is maximum. Just after separation, the angle of inclination with the local horizon of each vehicle 2, 50 is about 40°. FIG. 16 is a detail of the second end 36 of one of the struts 30, 32 shown in FIG. 15 and its associated pin 42. As is illustrated in FIG. 16, when the struts 30, 32 and vehicle 50 reach their separation positions, each pin 42 automatically slides out of its associates strut end 36.

Following separation, the aircraft 2 coasts on up to an altitude of about 127,000 feet and then glides with its air breathing engines 20 idling and descends to an optimum cruise altitude. Then, power is increased, and the aircraft 2 flies under air breathing power to a horizontal landing at an airfield. The vehicle 50 proceeds under the power of its main rocket engine 66 to orbit. The procedures for entering the desired orbit, operating while in orbit, and reentering the atmosphere are essentially the same as the procedures followed by the current space shuttle. Following reentry, the vehicle 50 glides in the atmosphere and makes an unpowered horizontal landing, also like the current space shuttle. The vehicle 50 may then be prepared for another launch.

FIGS. 18-23 show a second preferred embodiment of the invention. The major difference between the second preferred embodiment and the first preferred embodiment described above is that, in the second preferred embodiment, the rocket engine 66 of the orbiter vehicle 50 of the first embodiment is replaced by a scramjet engine 101. The relative merits of the two embodiments are discussed above. Both embodiments have the advantage of eliminating the need for carrying heavy landing gear, turbojet engines, and wing area sized for takeoff to orbit.

Referring to FIGS. 18-20, the aircraft 2' of the second preferred embodiment has a configuration similar to the configuration of the aircraft 2 of the first embodiment. The aircraft 2' has a delta wing 8' and a vertical tail 10' on each of the wing tips. As in the first embodiment, the aircraft 2' is provided with eight air breathing engines 20' arranged in two pods of four engines 20' each. The engines 20' are preferably of the same type as the engines 20 of the first embodiment. The aircraft 2' has two rocket engines 22', rather than the single rocket engine 22 of the first embodiment. These engines 22' are preferably of the same type as the rocket engine 22 of the first embodiment. Between the two rocket engines 22', a slot 6' is provided to accommodate the single vertical tail 52' of the orbiter vehicle 50'.

The orbiter vehicle 50' of the second embodiment has a delta wing 54' and a single vertical tail 52' positioned on the top of the rear portion of its fuselage 102. The orbiter vehicle 50' is provided with one or more orbital maneuvering rockets 68', preferably of the same type as the maneuvering rockets 68 of the first embodiment. As shown in FIG. 19, in the second preferred embodiment a single maneuvering rocket 68' is provided. If the payload to be carried by the orbiter 50' is to be larger, a second maneuvering rocket may also be provided.

The main engine of the orbiter 50' is a supersonic combustion ramjet, also known as a scramjet 101. Scramjet engine technology is discussed in an article by T. A. Heppenheimer, "Scramjets That Will Reach Mach 25", in the April 1986 issue of Popular Science, pages 94-97, 136, and 138, and in the Spring 1986 issue of Space Markets magazine, page 31, "Technology Challenges Ahead". The scramjet engine 101 of the second preferred embodiment is basically a rectangular tube the top of which is formed by the fuselage 102 of the orbiter 50'.

FIG. 23 is a simplified vertical sectional view of the type of scramjet engine that is currently preferred for inclusion in the second embodiment. The engine 101 includes an upper plate 104 and a lower plate 106. To provide the engine with variable geometry to adjust it to a range of Mach numbers, the upper plate 104 is movable longitudinally and vertically by suitable mechanisms (not shown). The forward and rear portions of the tube that forms the engine 101 are open to form an inlet 108, and the outlet of a nozzle 116. The geometry of the engine 101 is adjusted so that the shock wave of the inflowing air just hits the lip 110 of the inlet 108. The inflowing air decelerates to a lower supersonic speed as it moves into the throat portion of the engine 101. At the throat portion, fuel jets 112 inject fuel into the stream of air, and the fuel is burned in the combustion zone 114.

In the second preferred embodiment, the orbiter 50' is integrated into the underside of the aircraft 2' in the same manner that the orbiter 50 of the first embodiment is integrated into the aircraft 2. The procedure for preparing for a launch in each of the two embodiments is also essentially the same. In each case, the aircraft 2, 2' and the orbiter 50, 50' are preferably connected and secured together before fueling. When the orbiter 50, 50' has been secured in place, the landing gear of the orbiter 50, 50' is retracted, and then both the aircraft 2, 2' and the orbiter 50, 50' are fueled. The fueling of the orbiter 50, 50' is accomplished by cross-feeding fuel from the aircraft 2, 2' to the orbiter 50, 50'.

The takeoff and launch procedure following the fueling of the aircraft 2, 2' and orbiter 50, 50' is the same in both embodiments up until the point where the rocket engines are ignited. In the second preferred embodiment, at a Mach number of about 0.85 and an altitude of about 30,000 feet, the aircraft 2' assumes the orientation discussed above in connection with the firing of the rockets in the first embodiment, and the two rockets 22' of the aircraft 2' are ignited. The connected aircraft 2' and orbiter 50' then accelerate and climb to a Mach number of about 2.5 and an altitude of about 80,000 feet. At this point, the scramjet engine 101 is ignited, and the connected aircraft 2' and orbiter 50' continue to climb and accelerate. When the aircraft 2' and orbiter 50' reach a velocity of about Mach 3.3 and an altitude of about 90,000 feet, the rocket engines 22' are step throttled, as described above, to provide a thrust differential. This thrust differential causes the orbiter 50' to pivot away from and separate from the aircraft 2', as described above.

Following separation, the orbiter 50' continues to climb and accelerate to an altitude of about 40 miles and a velocity somewhat higher than orbital velocity. For example, a typical orbital velocity would be about 25,700 feet per second, in which case the orbiter 50' would accelerate to about 26,200 feet per second. Beyond an altitude of about 40 miles, there is insufficient atmosphere for the scramjet 101 to function. Therefore, the scramjet 101 is shut down at an altitude of about 40 miles, and the orbiter 50' coasts to the orbital altitude of about 100 miles. As the orbiter 50' coasts, it loses some velocity. After the orbiter 50' reaches its orbital altitude, the maneuvering rocket 68' is ignited to circularize the orbit. The procedures following attainment of orbit are the same in both embodiments.

As noted above, the second preferred embodiment of the invention has the advantage of optimizing the speed and trajectory for each type of engine. Ramjets have the advantage of operating very efficiently at hypersonic speeds. However, ramjets cannot operate efficiently at subsonic speeds, and efficient operation over a wide range of speeds from low supersonic to hypersonic can only be attained at the cost of significant weight penalties. The weight penalties are the result of a need for the engine to have a high degree of variable geometry. Scramjets that operate only at hypersonic speeds have the significant advantage of requiring significantly less variable geometry and, therefore, have a significant weight advantage over engines designed for a wide range of supersonic and hypersonic speeds.

A major advantage of the second preferred embodiment of the invention is that it maximizes the overall propulsion efficiency of the system by optimizing the speed at which each of the engines is operated. The scramjet is efficient in a range of about Mach 3 to about Mach 25. In the second preferred embodiment, the scramjet 101 is ignited just before its efficient range is attained, and separation and separate flight of the orbiter 50' are carried out within the efficient range. Thus, the choice of a staging velocity slightly higher than Mach 3 has the advantage of maximizing the efficient use of the scramjet 101 as well as the advantages of providing a high enough initial altitude and velocity for the orbiter 50' to attain orbit without an unreasonable fuel consumption and of maintaining a low enough velocity to minimize the heat protection and flyback range requirements for the aircraft 2'.

Throughout this description and the claims that follow, the term "fly" is used to indicate movement in both the usual sense of navigation in the air supported by the dynamic action of the air against the surfaces of a craft and in the sense of movement beyond the atmosphere of a transatmospheric vehicle.

It will be obvious to those skilled in the art to which this invention is addressed that the invention may be used to advantage in a variety of situations. Therefore, it is also to be understood by those skilled in the art that various changes, modifications, and omissions in form and detail may be made without departing from the spirit and scope of the invention as defined by the following claims.

What is claimed is:

1. A horizontal-takeoff transatmospheric launch system comprising:
   first and second stages including an aircraft and a transatmospheric vehicle, respectively; said aircraft including top and side portions having downwardly and laterally inwardly facing exterior surface portions defining a cavity opening onto bottom and aft portions of the aircraft; and said cavity being dimensioned to receive the transatmospheric vehicle, with substantially the entire upper surface of said vehicle enclosed by said exterior surface portions, to integrate said vehicle into the underside of the aircraft; and
   means for releasably connecting said stages together, with said vehicle integrated into said underside, prior to takeoff, and for releasing said stages from each other during flight to allow each stage to continue independently on its own separate flight path and the transatmospheric vehicle to proceed to orbit;
   said top and side portions forming a continuous load-bearing structure for carrying aircraft loads and the weight of the connected transatmospheric vehicle.

2. A system as described in claim 1, in which each of said stages includes landing gear comprising a plurality of wheels for rolling the respective stage on the ground; said landing gear of said stages being positioned and dimensioned so that, when each stage is supported on the ground on its respective landing gear, the second stage may be rolled on the wheels of its landing gear into a position in said cavity in which it is substantially integrated into the underside of the aircraft.

3. A system as described in claim 1, in which the means for releasably connecting and releasing said stages comprises a plurality of struts each having a first end pivotably connected to the aircraft and a second end pivotably connected to the transatmospheric vehicle, and means for releasably securing said vehicle against pivotal movement relative to the aircraft.

4. A system as described in claim 3, in which said means for releasably connecting and releasing further includes means for automatically disconnecting said second end of each strut from said vehicle upon a predetermined amount of pivotal movement of said vehicle with respect to the aircraft.

5. A system as described in claim 3, in which said second end of each strut defines a generally longitudinal slot with an open end; said vehicle has a plurality of pins mounted thereon each of which is received into one of said slots to connect said vehicle to the respective strut; and said pins and slots are positioned and dimensioned so that the pins will automatically slide out of the open ends of the slots upon a predetermined amount of pivotal movement of said vehicle with respect to the aircraft, to automatically release said vehicle from the aircraft.

6. A system as described in claim 2, in which each of the stages includes an engine; and which further comprises means for cross-feeding fuel from the first stage to the second stage to ensure that the second stage carries a maximum amount of fuel when the stages separate, and means for disconnecting said means for cross-feeding just prior to separation of the two stages.

7. A system as described in claim 1, in which each of the stages includes an engine, and said means for releasably connecting and releasing comprises means for allowing the second stage to automatically pivot away from the first stage in response to a thrust differential between the first and second stage engines created by reducing the thrust of the first stage engine while maintaining the thrust of the second stage engine.

8. A system as described in claim 3, in which each of the stages includes an engine, and said struts are positioned to allow the second stage to automatically pivot away from the first stage in response to a thrust differential between the first and second stage engines created by reducing the thrust of the first stage engine while maintaining the thrust of the second stage engine.

9. A system as described in claim 4, in which each of the stages includes an engine, and said struts are positioned to allow the second stage to automatically pivot away from the first stage in response to a thrust differential between the first and second stage engines created by reducing the thrust of the first stage engine while maintaining the thrust of the second stage engine.

10. A system as described in claim 5, in which each of the stages includes an engine, and said struts are positioned to allow the second stage to automatically pivot away from the first stage in response to a thrust differential between the first and second stage engines created by reducing the thrust of the first stage engine while maintaining the thrust of the second stage engine.

11. A system as described in claim 8, in which each of the stages includes landing gear comprising a plurality of wheels for rolling the respective stage on the ground, said landing gear of said stages being positioned and dimensioned so that, when each stage is supported on the ground on its respective landing gear, the second stage may be rolled on the wheels of its landing gear into a position in the cavity in which it is substantially integrated into the underside of the aircraft.

12. A system as described in claim 11, which further comprises means for cross-feeding fuel from the first stage to the second stage to ensure that the second stage carries a maximum amount of fuel when the stages separate, and means for disconnecting said means for cross-feeding just prior to separation of the two stages.

13. A method of launching a transatmospheric vehicle, comprising:
   providing an aircraft of the type having an air breathing engine;
   providing the aircraft with top and side portions that form a continuous load-bearing structure having downwardly and laterally inwardly facing exterior surface portions that define a cavity opening onto bottom and aft portions of the aircraft;
   integrating the transatmospheric vehicle into the underside of the aircraft by moving said vehicle into the cavity, releasably connecting the aircraft and said vehicle together, and releasably securing said vehicle in a position in the cavity in which it is integrated into said underside and substantially its entire upper surface is enclosed by said exterior surface portions;
   allowing said load-bearing structure to carry aircraft loads and the weight of the connected transatmospheric vehicle;
   operating said engine to accomplish a horizontal takeoff of the integrated aircraft and vehicle;
   flying the integrated aircraft and vehicle to a predetermined velocity and altitude; and
   upon reaching said predetermined velocity and altitude, releasing the aircraft and said vehicle from each other, and flying the aircraft and said vehicle independently of each other and said vehicle into orbit.

14. A method as described in claim 13, which further comprises providing each of the aircraft and said vehicle with a high velocity engine, and in which the step of flying to a predetermined velocity and altitude includes igniting said high velocity engines and climbing to said predetermined velocity and altitude.

15. A method as described in claim 14, in which the step of flying to a predetermined velocity and altitude includes, before igniting said high velocity engines, operating said air breathing engine and turning the aircraft as necessary to orient said vehicle into a desired orbit inclination and to offset said vehicle to a desired azimuth.

16. A method as described in claim 14, in which the step of releasing the aircraft and said vehicle from each other includes reducing the thrust of the aircraft high velocity engine while maintaining the thrust of the high velocity engine of said vehicle to provide a thrust differential between the aircraft high velocity engine and the high velocity engine of said vehicle, and allowing the thrust differential to cause the aircraft and said vehicle to pivot away from each other.

17. A method as described in claim 14, further comprising cross-feeding fuel from the aircraft to said vehicle to ensure that said vehicle carries a maximum amount of fuel when the aircraft and said vehicle separate.

18. A method as described in claim 16, further comprising cross-feeding fuel from the aircraft to said vehicle to ensure that said vehicle carries a maximum amount of fuel when the aircraft and said vehicle separate.

19. A method as described in claim 13, in which the step of releasing the aircraft and said vehicle from each other is carried out upon reaching a Mach number of about 2.5 to about 3.5 and an altitude sufficient to allow said vehicle to attain orbit and accomplish a predetermined mission.

20. A method as described in claim 14, in which the step of releasing the aircraft and said vehicle from each other is carried out upon reaching a Mach number of about 2.5 to about 3.5 and an altitude sufficient to allow said vehicle to attain orbit and accomplish a predetermined mission.

21. A method as described in claim 20, further comprising cross-feeding rocket fuel from the aircraft to said vehicle to ensure that said vehicle carries a maximum amount of rocket fuel when the aircraft and said vehicle separate.

22. A method as described in claim 20, in which the step of flying to a predetermined velocity and altitude includes, before igniting said rocket engines, operating said air breathing engine and turning the aircraft as necessary to orient said vehicle into a desired orbit inclination and to offset said vehicle to a desired azimuth.

23. A method of launching a transatmospheric vehicle, comprising:
   providing an aircraft of the type having landing gear and an air breathing engine;
   providing the aircraft with top and side portions that form a continuous load-bearing structure having downwardly and laterally inwardly facing exterior surface portions that define a cavity opening onto bottom and aft portions of the aircraft;
   providing the transatmospheric vehicle with landing gear;
   supporting each of the aircraft and said vehicle on the ground on its landing gear, and aligning the aircraft and said vehicle with said vehicle spaced aftwardly of the aircraft;
   while maintaining the aircraft and said vehicle so supported and aligned, moving said vehicle forwardly toward the aircraft and into the cavity;
   releasably connecting the aircraft and said vehicle together and releasably securing said vehicle in position in the cavity, to integrate said vehicle into the underside of the aircraft;
   allowing said load-bearing structure to carry aircraft loads and the weight of the connected transatmospheric vehicle;
   retracting the landing gear of the transatmospheric vehicle after connecting the aircraft and the transatmospheric vehicle together and securing the transatmospheric vehicle in position;
   after retracting the landing gear of said vehicle, fueling said vehicle by cross-feeding fuel from the aircraft to said vehicle;
   after fueling said vehicle, operating said engine to accomplish a horizontal takeoff of the integrated aircraft and vehicle;
   flying the integrated aircraft and vehicle to a predetermined velocity and altitude; and
   upon reaching said predetermined velocity and altitude, releasing the aircraft and said vehicle from each other, and flying the aircraft and said vehicle independently of each other and said vehicle into orbit.

24. A method of launching a transatmospheric vehicle, comprising:

providing an aircraft of the type having an air breathing engine;

providing the aircraft with a rocket engine, and providing the transatmospheric vehicle with a scramjet engine;

releasably connecting the aircraft and the transatmospheric vehicle together;

operating said air breathing engine to accomplish a horizontal takeoff of the connected aircraft and vehicle;

flying the connected aircraft and vehicle, including igniting said rocket engine and then accelerating to a Mach number of about 3.3 and climbing to an altitude sufficient to allow said vehicle to attain orbit and accomplish a predetermined mission;

while so accelerating and climbing, igniting said scramjet engine; and upon reaching said Mach number and altitude, releasing the aircraft and said vehicle from each other and flying the aircraft and said vehicle independently of each other; including operating said scramjet engine to cause the separated transatmospheric vehicle to continue to accelerate to a velocity exceeding orbital velocity and climb to about the maximum altitude at which the scramjet engine can function, and then allowing said vehicle to coast to orbital altitude.

25. A method as described in claim 24, in which the step of flying the connected aircraft and vehicle includes, before igniting said rocket engine, operating said air breathing engine and turning the aircraft as necessary to orient said vehicle into a desired orbit inclination and to offset said vehicle to a desired azimuth.

26. A method of launching a transatmospheric vehicle, comprising:

providing an aircraft of the type having an air breathing engine;

providing the aircraft with a rocket engine, and providing the transatmospheric vehicle with a scramjet engine;

releasably connecting the aircraft and the transatmospheric vehicle together;

operating said air breathing engine to accomplish a horizontal takeoff of the connected aircraft and vehicle;

flying the connected aircraft and vehicle, including igniting said rocket engine and then accelerating to a Mach number of about 3.3 and climbing to an altitude sufficient to allow said vehicle to attain orbit and accomplish a predetermined mission;

while so accelerating and climbing, igniting said scramjet engine; and upon reaching said Mach number and altitude, releasing the aircraft and said vehicle from each other and flying the aircraft and said vehicle independently of each other;

wherein the step of releasing the aircraft and said vehicle from each other includes reducing the thrust of the aircraft rocket engine while maintaining the thrust of the transatmospheric vehicle scramjet engine to create a thrust differential between the aircraft rocket engine and the transatmospheric vehicle scramjet engine, and allowing the thrust differential to cause the aircraft and said vehicle to pivot away from each other.

27. A method as described in claim 26, further comprising cross-feeding fuel from the aircraft to said vehicle to ensure that said vehicle carries a maximum amount of fuel when the aircraft and said vehicle separate.

28. A method of launching a transatmospheric vehicle of the type having an engine, said method comprising:

providing an aircraft;

providing the aircraft with an engine and a plurality of struts, each such strut having a first end pivotably connected to the aircraft;

pivotably connecting a second end of each strut to said vehicle, and releasably securing said vehicle against pivotal movement relative to the aircraft;

flying the aircraft and secured vehicle to a predetermined Mach number and altitude, including igniting said engines of the aircraft and said vehicle to provide thrust;

reducing the thrust of said aircraft engine while maintaining the thrust of said vehicle engine, to provide a thrust differential;

allowing said thrust differential to cause the aircraft and said vehicle to pivot away from each other; and then releasing one end of each strut to allow the aircraft and said vehicle to separate from each other and fly independently.

29. A method as described in claim 28, in which said predetermined Mach number and altitude equals a Mach number of about 2.5 to about 3.5 and an altitude sufficient to allow said vehicle to attain orbit and accomplish a predetermined mission.

30. A method as described in claim 28, further comprising cross-feeding fuel from the aircraft to said vehicle to ensure that said vehicle carries a maximum amount of fuel when the aircraft and said vehicle separate.

31. A method as described in claim 29, further comprising cross-feeding fuel from the aircraft to said vehicle to ensure that said vehicle carries a maximum amount of fuel when the aircraft and said vehicle separate.

32. A method as described in claim 28, which further comprises providing said second end of each strut with a generally longitudinal slot, and mounting a plurality of pins on said vehicle and positioning each of said pins to be received into one of the slots to connect said vehicle to the respective strut; and in which the step of releasing one end of each strut comprises allowing said pins to automatically slide out of said slots.

33. A method as described in claim 28, in which the aircraft provided has an air breathing engine; and in which the step of flying the aircraft and secured vehicle further includes, before igniting said engines, operating said air breathing engine and turning the aircraft as necessary to orient said vehicle into a desired orbit inclination and to offset said vehicle to a desired azimuth.

34. A method as described in claim 29, in which the aircraft provided has an air breathing engine; and in which the step of flying the aircraft and secured vehicle further includes, before igniting said engines, operating said air breathing engine and turning the aircraft as necessary to orient said vehicle into a desired orbit inclination and to offset said vehicle to a desired azimuth.

35. A method as described in claim 28, in which said engine of the aircraft is a rocket engine, and said engine of said vehicle is a rocket engine.

36. A method as described in claim 28, in which said engine of the aircraft is a rocket engine, and said engine of said vehicle is a scramjet engine.

37. A method as described in claim 36, in which the step of flying the aircraft and secured vehicle includes igniting said rocket engine and then accelerating to said Mach number and climbing to said altitude, and, while so accelerating and climbing, igniting said scamjet engine.

* * * * *